United States Patent
Dobrin et al.

(10) Patent No.: US 6,383,431 B1
(45) Date of Patent: May 7, 2002

(54) METHOD OF MODIFYING A NONWOVEN FIBROUS WEB FOR USE AS COMPONENT OF A DISPOSABLE ABSORBENT ARTICLE

(75) Inventors: George Christopher Dobrin, Mason, OH (US); Douglas Herrin Benson, West Harrison, IN (US); John Joseph Curro, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/274,946

(22) Filed: Mar. 23, 1999

Related U.S. Application Data

(63) Continuation-in-part of application No. 08/832,875, filed on Apr. 4, 1997, now Pat. No. 5,914,084.

(51) Int. Cl.[7] .................. B29C 55/14; B29C 59/04; B29C 65/48; B29C 65/56; B32B 31/08

(52) U.S. Cl. .................. 264/154; 156/229; 156/324; 264/171.13; 264/288.8; 264/290.2

(58) Field of Search .................. 264/154, 171.13, 264/288.8, 290.2; 156/229, 324

(56) References Cited

U.S. PATENT DOCUMENTS

| | | |
|---|---|---|
| 3,156,242 A | 11/1964 | Crowe |
| 3,156,342 A | 11/1964 | Brewer |
| 3,881,489 A | 5/1975 | Hartwell |
| 3,989,867 A | 11/1976 | Sisson |
| 4,116,892 A | 9/1978 | Schwarz |
| 4,153,664 A * | 5/1979 | Sabee .................. 264/288.8 X |
| 4,153,751 A | 5/1979 | Schwarz |
| 4,539,256 A | 9/1985 | Shipman |

(List continued on next page.)

FOREIGN PATENT DOCUMENTS

| | | |
|---|---|---|
| EP | 0 810 078 A1 | 12/1997 |
| WO | WO 98/28134 | 7/1998 |
| WO | WO 98/29246 | 7/1998 |
| WO | WO 98/29247 | 7/1998 |
| WO | WO 98/29479 | 7/1998 |
| WO | WO 98/29480 | 7/1998 |
| WO | WO 86/51475 | 11/1998 |
| WO | WO 99/12734 | 3/1999 |
| WO | WO 99/14039 | 3/1999 |
| WO | WO 99/14044 | 3/1999 |
| WO | WO 99/14262 | 3/1999 |
| WO | WO 99/14263 | 3/1999 |

OTHER PUBLICATIONS

PCT International Search Report for International Application No. PCT/US00/07583, date of mailing Jul. 5, 2000 (8 pages).

Primary Examiner—Leo B. Tentoni
(74) Attorney, Agent, or Firm—Michael S. Kolodesh; Ken K. Patel; Kevin D. Hogg

(57) ABSTRACT

An economical method is disclosed for modifying the physical characteristics of a nonwoven fibrous web which involves passing the web between at least one pair of interengaged rolls to incrementally stretch the web, and then withdrawing the incrementally stretched web from between the rolls under tension. A web modified according to the disclosed method has advantageous elongation, extensibility and strength properties, as well as other desirable characteristics. In another aspect, a method is disclosed for forming a composite material by combining a modified nonwoven web with a polymeric film, or an elastic member, which may be liquid impervious yet breathable. In yet other aspect, a method is disclosed for forming a composite material by combining a modified web with a polymeric film which is rendered liquid-impervious yet breathable while the method is performed. The modified nonwoven webs and composite materials made according to the disclosed methods may be advantageously employed in absorbent articles such as disposable diapers.

20 Claims, 9 Drawing Sheets

U.S. PATENT DOCUMENTS

| | | | |
|---|---|---|---|
| 4,657,802 | A | 4/1987 | Morman |
| 4,725,481 | A | 2/1988 | Ostapchenko |
| 4,789,699 | A | 12/1988 | Kieffer et al. |
| 4,833,172 | A | 5/1989 | Schwarz et al. |
| 4,834,741 | A | 5/1989 | Sabee |
| 4,965,122 | A | 10/1990 | Morman |
| 4,981,747 | A | 1/1991 | Morman |
| 5,114,781 | A | 5/1992 | Morman |
| 5,116,662 | A | 5/1992 | Morman |
| 5,143,679 | A | 9/1992 | Weber et al. |
| 5,151,092 | A | 9/1992 | Buell et al. |
| 5,156,793 | A | 10/1992 | Buell et al. |
| 5,167,897 | A | 12/1992 | Weber et al. |
| 5,226,992 | A | 7/1993 | Morman |
| 5,336,545 | A | 8/1994 | Morman |
| 5,382,461 | A | 1/1995 | Wu |
| 5,422,172 | A | 6/1995 | Wu |
| 5,509,142 | A | 4/1996 | Connell et al. |
| 5,514,470 | A | 5/1996 | Haffner et al. |
| 5,518,801 | A | 5/1996 | Chappell et al. |
| 5,569,234 | A | 10/1996 | Buell et al. |
| 5,571,096 | A | 11/1996 | Dobrin et al. |
| 5,592,690 | A | 1/1997 | Wu |
| 5,681,645 | A | 10/1997 | Strack et al. |
| 5,688,157 | A | 11/1997 | Bradley et al. |
| 5,695,849 | A | 12/1997 | Shawver et al. |
| 5,695,868 | A | 12/1997 | McCormack |
| 5,789,065 | A | 8/1998 | Haffner et al. |
| 5,814,390 | A | 9/1998 | Stokes et al. |
| 5,837,352 | A | 11/1998 | English et al. |
| 5,843,056 | A | 12/1998 | Good et al. |
| 5,843,057 | A | 12/1998 | McCormack |
| 5,843,066 | A | 12/1998 | Dobrin |
| 5,853,881 | A | 12/1998 | Estey et al. |
| 5,855,999 | A | 1/1999 | McCormack |
| 5,861,074 | A | 1/1999 | Wu |
| 5,865,823 | A | 2/1999 | Curro |
| 5,865,926 | A | 2/1999 | Wu et al. |
| 5,883,028 | A | 3/1999 | Morman et al. |
| 5,910,136 | A | 6/1999 | Hetzler et al. |
| 5,910,224 | A | 6/1999 | Morman |
| 5,910,225 | A | 6/1999 | McAmish et al. |
| 5,914,084 | A | 6/1999 | Benson et al. |

* cited by examiner

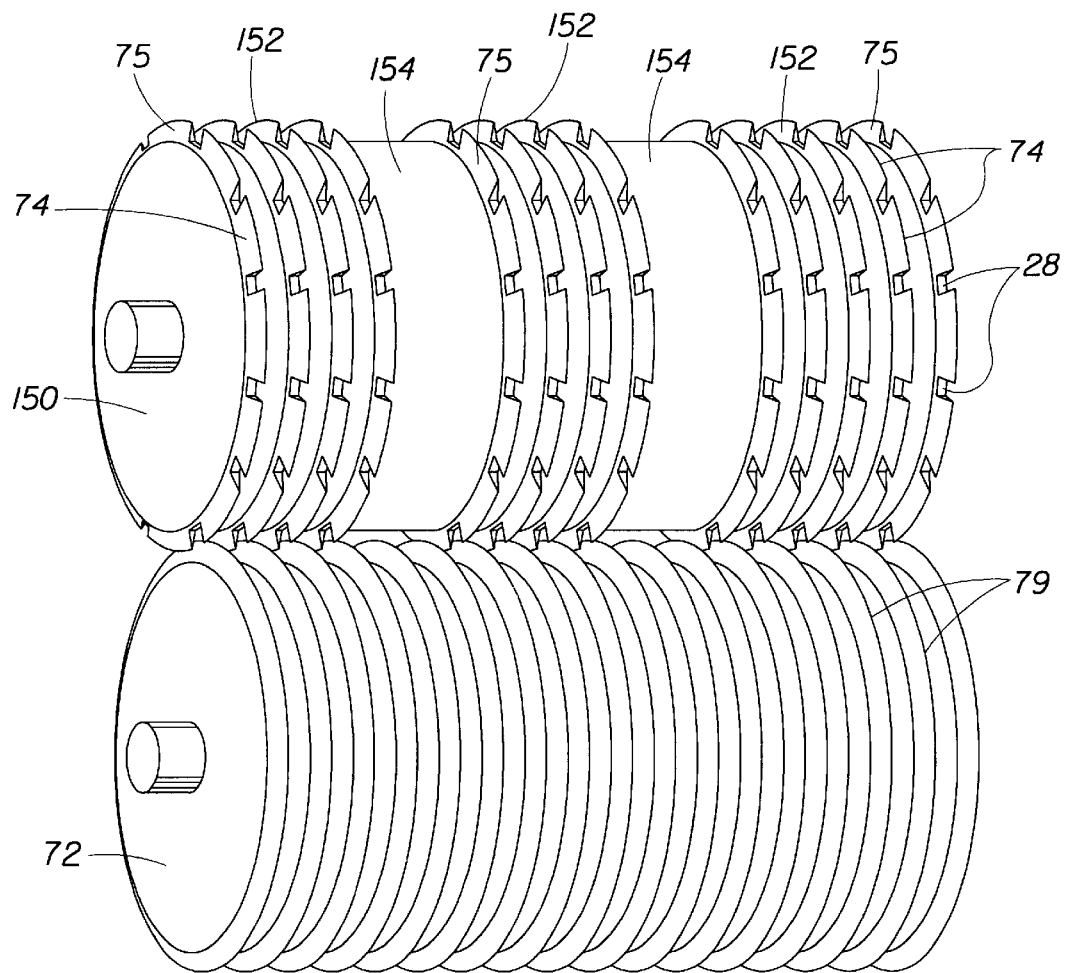
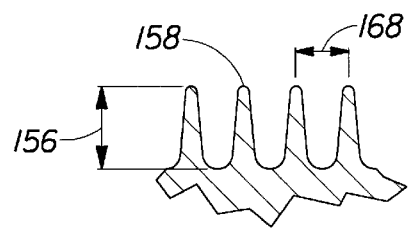
Fig. 13
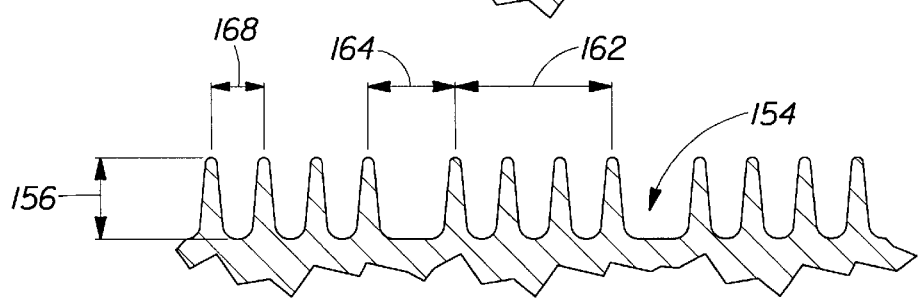
Fig. 14

METHOD OF MODIFYING A NONWOVEN FIBROUS WEB FOR USE AS COMPONENT OF A DISPOSABLE ABSORBENT ARTICLE

This application is a continuation-in-part of U.S. application Ser. No. 08/832,875, filed Apr. 4, 1997, now U.S. Pat. No. 5,914,084.

FIELD OF THE INVENTION

The present invention relates to disposable absorbent articles. More particularly, the invention relates to an economical method for advantageously modifying the physical properties of a nonwoven fibrous web for use as a component of a disposable absorbent article, and to disposable articles incorporating such modified nonwoven webs.

BACKGROUND OF THE INVENTION

Disposable, wearable articles having an inner, body-facing, absorbent, liquid-retaining component and an outer, garment-facing, liquid-impervious component are well known. Articles of that type are commonly available in the form of disposable diapers, disposable underwear, pull-on diapers and training pants, incontinence pads, incontinence briefs, sanitary napkins, and the like. Such articles generally include a flexible, liquid-impervious backsheet that is adapted to be positioned between an absorbent component of the article and the clothing of the wearer, to prevent wetting or soiling of the wearer's clothing when the article is in use.

In addition to imperviousness to liquids, the backsheet also preferably includes a cloth-like outer surface, which provides a softer feel, and also a more appealing visual appearance, as compared with the outer surface of a smooth, flat plastic film. Two-ply backsheets that provide a desirable, more cloth-like appearance for such disposable, wearable articles are also known. In that regard, U.S. Pat. No. 5,151,092, entitled "Absorbent Article with Dynamic Elastic Waist Feature Having a Predisposed Resilient Flexural Hinge," which issued on Sep. 29, 1992, to Kenneth B. Buell, et al., discloses a disposable diaper backsheet formed either from a woven or a nonwoven material, a polymeric film, or a composite material in the form of a film-coated, nonwoven material. That patent also discloses the step of embossing of a plastic film backsheet to provide a more cloth-like visual appearance to a plastic film.

Also known to those skilled in the art are methods for imparting stretchability to an otherwise substantially inelastic material, which may be employed as a backsheet. For example, the use of corrugating rolls to laterally or longitudinally stretch and to simultaneously provide a corrugated form to thin plastic films is disclosed in U.S. Pat. No. 4,116,892, entitled "Process for Stretching Incremental Portions of an Orientable Thermoplastic Substrate and Product Thereof," which issued on Sep. 26, 1978, to Eckhard C. A. Schwarz; U.S. Pat. No. 4,834,741, entitled "Diaper With Waistband Elastic," which issued on May 30, 1989, to Reinhardt N. Sabee; U.S. Pat. No. 5,156,793, entitled "Method for Incrementally Stretching Zero Strain Stretch Laminate Sheet In A Non-Uniform manner To Impart A Varying Degree Of Elasticity Thereto," which issued on Oct. 20, 1992, to Kenneth B. Buell et al.; U.S. Pat. No. 5,167,897, entitled "Method for Incrementally Stretching A Zero Strain Stretch Laminate Sheet To Impart Elasticity Thereto," which issued on Dec. 1, 1992 to Gerald M. Sheeter et al.; and U.S. Pat. No. 5,422,172, entitled "Elastic Laminated Sheet of An Incrementally Stretched Nonwoven Fibrous Sheet and Elastomeric Film and Method," which issued on Jun. 6, 1995, to Pai-Chuan Wu. The corrugating rolls disclosed in each of those patents are employed in carrying out a process sometimes referred to as "ring-rolling," to locally stretch and form corrugations in the material, in order to impart a greater degree of stretchability to selected portions of a sheet or web that may serve as a backsheet for disposable absorbent articles. Such backsheets can include both a polymeric film and an overlying and contacting layer of nonwoven, fibrous material.

In addition to incorporation into backsheets, nonwoven materials can also be incorporated into and form a part of a liquid-pervious topsheet, as well as in leg cuffs that are provided to minimize leakage from the article. Other structural members of disposable absorbent articles can also include nonwoven elements, particularly where stretchability of the material is a desirable attribute for providing improved fit of the article.

In order to provide improved comfort to the wearer of disposable absorbent articles, certain components of the articles, such as a backsheet, in addition to providing imperviousness to liquids, desirably permit the passage therethrough of moisture vapor and also preferably air, to help maintain dryness and to reduce the humidity adjacent the wearer's body. An impervious polymeric film to which breathability has been imparted to allow air and moisture vapor transmission through the film is disclosed U.S. Pat. No. 3,156,342, entitled "Flexible Absorbent Sheet," which issued on Nov. 10, 1964, to G. A. Crowe, Jr.; U.S. Pat. No. 3,881,489, entitled "Breathable, Liquid Impervious Backsheet for Absorbent Devices," which issued on May 6, 1975 to Edward Wallace Hartwell, et al.; U.S. Pat. No. 3,989,867, entitled "Absorbent Devices Having Porous Backsheet," which issued on Nov. 2, 1976, to James Bryant Sisson; U.S. Pat. No. 4,153,751, entitled "Process for Stretching an Impregnated Film of Material and The Microporous Product Produced Thereby," which issued on May 8, 1979, to Eckhard C. A. Schwarz; and U.S. Pat. No. 4,539,256, entitled "Microporous Sheet Material, Method of Making and Articles Made Therewith," which issued on Sep. 3, 1985, to Gene H. Shipman.

Although there have been significant product improvements in recent years that have resulted in improved functioning and increased consumer acceptance of disposable absorbent articles, it is still desirable to provide an economical way to form for use in such articles a stretchable nonwoven material having optimal physical properties, which may for example be employed in a backsheet that is impervious to liquids, that is pervious to moisture vapor and also preferably air, and that additionally has a soft, cloth-like outer surface.

Accordingly, it is an object of the present invention to provide an economical method for advantageously modifying a pre-formed, nonwoven fibrous web to have desirable properties which can be used as a component or an extensible component of a disposable absorbent article.

It is another object of the present invention to provide a method for making a relatively inexpensive, flexible composite material which can be used in a disposable absorbent article, wherein the composite material may include the attribute of liquid-imperviousness, and the desirable attribute of perviousness to moisture vapor and also preferably air, as well as the desirable attribute of a soft, cloth-like feel on at least one of its surfaces.

It is a further object of the present invention to provide a method for economically modifying a pre-formed, nonwoven fibrous web and joining it to an elastic component to create a composite material which can be advatageously used as a elastically stretchable, and if desired breathable, component of a disposable absorbent article.

SUMMARY OF THE INVENTION

Briefly stated, in accordance with one aspect of the present invention, an economical method is provided for advantageously modifying the physical characteristics of a pre-formed, nonwoven fibrous web. The method includes feeding in a web movement direction to a pair of opposed forming rolls a substantially untensioned, nonwoven fibrous web having an initial width, thickness, basis weight, low-elongation cross-web extensibility expressed as an initial load to achieve 10% cross-web elongation, intermediate-elongation cross-web extensibility expressed as an initial load to achieve 30% cross-web elongation, cross-web strength, and elongation capability. The web is gripped between the forming rolls at a nip defined by the forming rolls. Each forming roll includes a plurality of axially spaced, circumferentially extending, alternating radial teeth and intervening grooves that are in interengaged condition, with the teeth of each roll extending into the grooves of the opposed roll.

The gripped nonwoven web is subjected to incremental lateral stretching by passing the web between the interengaged forming rolls while the rolls are rotating in opposite directions to incrementally stretch the web in a lateral, cross-web (i.e., "cross-machine" or CD) direction that is substantially perpendicular to the longitudinal, web movement (i.e., "machine" or MD) direction. The incrementally stretched web is then withdrawn from between the forming rolls by applying to the stretched web a substantially uniform tensile force in the web movement direction as the web passes from the forming rolls, to stretch the web in the web movement direction to obtain a modified web which has a load to achieve 10% cross-web elongation of from about 5% to about 100% of the initial load to achieve 10% cross-web elongation, a load to achieve 30% cross-web elongation of from about 5% to about 100% of the initial load to achieve 30% cross-web elngation, a cross-web strength of from about 10% to about 80% of the initial cross-web strength, and an elongation capability of from about 105% to about 200% of the initial cross-web elongation capability. The web may also have a modified web width that is from about 25% to about 300% of the initial web width, a modified web thickness that is from about 85% to about 400% of the initial web thickness, and a modified basis weight that is less than, equal to, or greater than the initial web basis weight.

In accordance with another aspect of the present invention, a method is provided for combining a modified nonwoven fibrous web of the invention with a polymeric film, or with an elastic member, which may be liquid-impervious, yet breathable.

In accordance with still another aspect of the present invention, a method is provided for making a liquid-impervious, breathable material which can be used, for example, as a backsheet for a disposable absorbent article having a soft, cloth-like, outermost surface. The method includes providing a nonwoven fibrous web having its physical properties modified by having passed through a pair of forming rolls. A thermoplastic polymeric film is provided that includes an incompatible inorganic material dispersed therewithin to provide a plurality of discrete, spaced regions of inorganic material within a polymer matrix. The polymeric film includes a first face and a second face. The modified fibrous nonwoven web is then combined with the polymeric film to form a composite web, wherein the second face of the polymeric film defines an outwardly-facing surface of the composite web. The composite web is then passed between a pair of opposed, closely spaced forming rolls each having a plurality of alternating teeth and grooves that are in intermeshing relationship. The forming rolls impart cross-web tensile forces to the composite web, which provides micropores within the polymeric film as a result of localized stretching of the film to cause localized separation of the thermoplastic polymer from the incompatible material to provide the micropores. The micropores so provided are of a size that permits the passage through the composite web of air and moisture vapor but substantially prevents the passage therethrough of liquids.

The present invention also includes the soft, cloth-like, liquid-impervious and breathable backsheets, and other absorbent article components, such as topsheets, cuffs and other structural members that are formed by incorporating a nonwoven fibrous web that has been modified in accordance with the methods herein described.

BRIEF DESCRIPTION OF THE DRAWINGS

FIG. 12 is an enlarged, fragmentary perspective view of another set of forming rolls wherein the upper roll has another, different tooth and groove configuration.

FIG. 13 is an enlarged, fragmentary cross-sectional view of the uninterrupted teeth of the lower forming roll that is shown in FIG. 2.

FIG. 14 is an enlarged, fragmentary cross-sectional view of the tooth and groove configuration of the upper forming roll shown in FIG. 2.

DETAILED DESCRIPTION OF THE INVENTION

Figure 1:
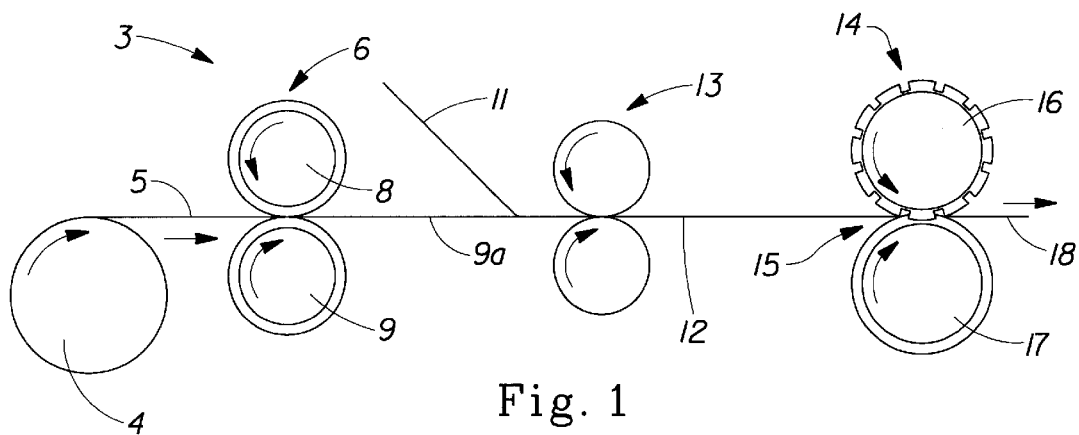
FIG. 1 is a schematic illustration of an exemplary process and apparatus for modifying a nonwoven web and for forming a cloth-like, breathable composite material in accordance with the present invention.

The present invention is directed to the modification of the physical properties, and if desired the dimensions, of nonwoven material intended for use in disposable absorbent articles. After modification, the nonwoven material can, if desired, be joined with other materials for incorporation as functional and structural elements of disposable absorbent articles. Examples of such other materials include liquid-impervious films yet breathable films, precursor films that can be made to be breathable, elastomeric films, and the like. Although disclosed herein in the context of use with disposable articles, it will be apparent to those skilled in the art that such modified nonwoven materials also can be employed in other structures intended for other uses.

As used herein, the term "nonwoven" refers to a fibrous web or sheet that has a structure of individual fibers or threads that are interlaid, but not in any regular, repeating manner. Nonwoven sheets have in the past been formed by a variety of processes, such as meltblowing processes spun-bonding processes, and bonded carded processes.

As used herein, the term "extensible" refers to any material that upon application of a biasing force is stretchable, or that is elongatable by at least about 50% (i.e., having a stretched, biased length that is at least about 150% of its relaxed, unbiased length).

As used herein, the term "polymer" generally includes, but is not limited to, homopolymers, copolymers, such as block, graft, random, and alternating copolymers, terpolymers, and the like, and blends and modifications thereof. Furthermore, unless otherwise specifically limited, the term "polymer" includes all possible molecular geometric configurations of the polymeric material. Such configurations include, but are not limited to, isotactic, syndiotactic, and random symmetries.

As used herein, the term "elastic" refers to any material that, upon application of a biasing force, is stretchable, that is, elongatable, to at least about 50% (i.e., to a stretched, biased length, which is at least about 150% of its relaxed unbiased length), and which, will recover at least about 50% of its elongation upon release of the stretching, elongation force.

As used herein, the term "composite elastic material" refers to a material that includes an elastic material component that is joined to an extensible material component. The elastic component can be joined to the extensible component at spaced, intermittent points or it can be continuously bonded thereto. The joinder of the components is accomplished while the elastic member and the extensible material are in juxtaposed position. The composite elastic material thus formed is also elastic. A composite elastic material can include more than the two layers described, if desired.

As used herein, the term "elongation capability" refers to the degree to which any material can be stretched, either in the web movement direction or in the cross-web direction, when a tensile biasing force is applied to the material without catastrophic failure of the material. The stretch is expressed herein as a percent (%), and is based upon the original, unstretched length and the stretched length immediately before rupture or failure of the material.

As used herein, the term "load to elongate" refers to the biasing force that must be applied to any material to elongate it to a given elongation, either in the web movement direction or in the cross-web direction, wherein the elongation is expressed as a percent (%), and is based upon the original, unstretched length and the stretched length.

As used herein, the term "surface-pathlength" refers to a measurement along a topographic surface of a material in a specified direction.

Modification of Nonwovens

Referring now to the drawings, and particularly to FIG. 1 thereof, there is schematically illustrated at 3 apparatus and a method for modifying the physical and performance properties, and if desired the size, of a previously-formed, nonwoven web 5 that is carried on and that is drawn from a supply roll 4. The apparatus and method provide a physically modified nonwoven web having improved physical properties and modified dimensions that may serve to improve both the performance and the fit of disposable articles that incorporate such modified nonwoven materials. Additionally, after being modified in the disclosed apparatus and after having acquired the desired physical proper ties hereinafter described, such modified nonwoven webs are capable of further processing, if desired, whether alone or together with other materials, and without the modified nonwoven web experiencing disintegration, rupture, or loss of integrity.

Although the ensuing discussion is based upon nonwoven materials in web form for high-speed production purposes, the nonwoven materials, as well as other materials to which the nonwoven materials are joined, can also be provided in the form of generally rectangular, discrete sheets of interengaged fibers, both before and after modification in accordance with the present invention. Thus, as used herein, the word "web" is intended to encompass such discrete sheets.

A nonwoven web of the type contemplated herein is in substantially flat form and is formed from a plurality of interengaged fibers. The web has a longitudinal axis that extends along the web movement or "machine" (MD) direction of the web, and a transverse axis that extends in the cross-web or "cross-machine" (CD) direction of the web. The interengaged fibers define a relatively thin, coherent, self-supporting structure. The fibers can be loosely interengaged, without bonds connecting adjacent fibers, or they can be bonded to each other or otherwise connected with other such fibers by suitable connection elements, such as adhesives, or the like, or adjacent fibers can be at least partially melt bonded to each other.

Preferably, web 5 is a coherent, fibrous structure that can readily be handled initially without significant separation of the fibers from each other, so that the web does not disintegrate or break into fragments. Suitable fibrous webs can be made from natural fibers, such as wood fibers or cotton fibers; from synthetic fibers, such as polyester or polyolefin fibers, and if the latter, polyethylene, polypropylene, or blends thereof; or from a combination of natural fibers and synthetic fibers. Additionally, the fibers can be disposed in interengaged form by employing any of several different, known processes for forming such webs, such as processes identified by the terms spunbonded, carded, wet-laid, melt-blown, hydroentangled, or combinations of those processes, as will be appreciated by those skilled in the art.

A preferred material for web 5 is a spunbonded, nonwoven, fibrous material formed from interengaged polyolefin fibers. An example of such a preferred material is a spunbonded web of interengaged polyolefin fibers, wherein the web has an initial thickness of about 10 mils and an initial basis weight of about 27 gm/m$^2$. The fibers can have a denier of from about 1.5 to about 10.0.

Suitable nonwoven webs can be made from 100% polyethylene fibers, either linear, low-density polyethylene or high-density polyethylene. Included among such suitable and preferred nonwoven materials is a spunbonded material that is known commercially as 13561A, and which is available from FiberWeb North America, Inc., of Simpsonville, S.C.

The preferred nonwoven, fibrous web materials can have an initial thickness of from about 5 mils to about 40 mils, preferably of from about 10 mils to about 20 mils. Additionally, the preferred webs can have an initial basis weight of from about 10 gm/m$^2$ to about 80 gm/m$^2$, preferably from about 10 gm/m$^2$ to about 40 gm/m$^2$, and most preferably from about 25 gm/m$^2$ to about 35 gm/m$^2$.

Referring again to FIG. 1, nonwoven web 5 is withdrawn from supply roll 4 and travels in the direction indicated by the arrow. Web 5 is fed to the nip 7 formed by a pair of opposed forming rolls 8 and 9 that together define a first forming station 6. The structure and relative positions of forming rolls 8, 9 of first forming station 6 are shown in an enlarged perspective view in FIG. 2. As shown, rolls 8 and 9 are carried on respective rotatable shafts 21, 23, having their axes of rotation disposed in parallel relationship. Each of rolls 8 and 9 includes a plurality of axially-spaced, side-by-side, circumferentially-extending, equally-configured teeth 22 that can be in the form of thin fins of substantially rectangular cross section, or they can have a triangular or an inverted V-shape when viewed in cross section. If they are triangular, the vertices of teeth 22 are outermost. In any event, the outermost tips of the teeth are preferably rounded, as shown in greater detail in FIGS. 3 and 4, to avoid cuts or tears in the materials, such as nonwoven web 5, that pass between the rolls.

The spaces between adjacent teeth 22 define recessed, circumferentially-extending, equally configured grooves 24. The grooves can be of substantially rectangular cross section when the teeth are of substantially rectangular cross section, and they can be of inverted triangular cross section when the teeth are of triangular cross section. Thus, each of forming rolls 8 and 9 includes a plurality of spaced teeth 22 and alternating grooves 24 between each pair of adjacent teeth. The teeth and the grooves need not each be of the same width, however, and preferably the grooves have a larger width than that of the teeth, to permit the material that passes between the interengaged rolls to be received within the respective grooves and to be locally stretched, as will be explained hereinafter.

Figure 3:
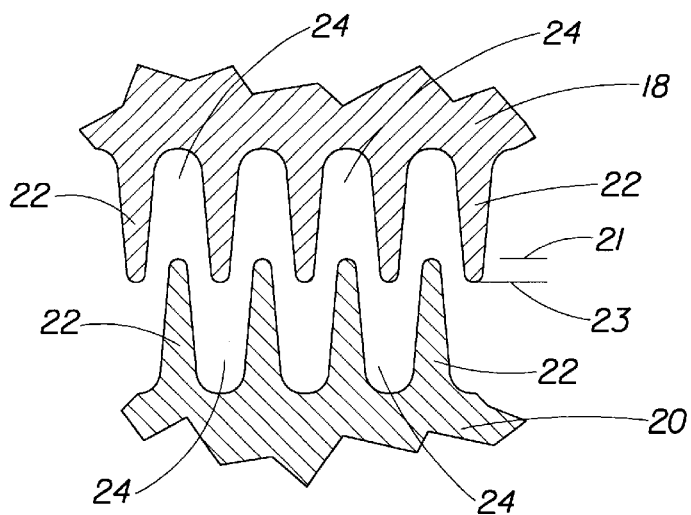
FIG. 3 is an enlarged, fragmentary, cross-sectional view showing the interengagement of respective teeth and grooves of the forming rolls shown in FIG. 4.

FIG. 3 is an enlarged, fragmentary, cross-sectional view showing the interengagement of teeth 22 and grooves 24 of the respective rolls. As shown, generally triangular teeth 22 of one roll extend partially into generally triangular grooves 24 of the opposed roll, so that imaginary lines 21 and 23 interconnecting the rounded outer tips of teeth 22 of rolls 8 and 9, respectively, lie radially inwardly of the rounded outer tips of teeth 22 of the opposed roll. The respective axes of rotation of rolls 8 and 9 so spaced from each other that there is a predetermined space or gap between the opposed sidewalls of the interengaged teeth and grooves of the respective rolls.

Figure 4:
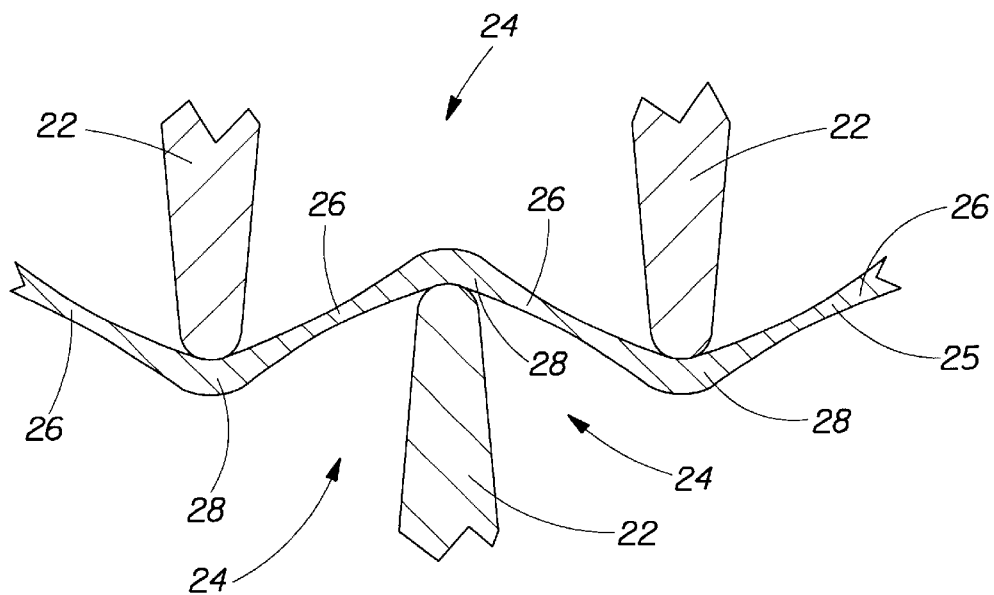
FIG. 4 is a further enlarged, fragmentary, cross-sectional view showing the tip portions of the interengaged forming roll teeth with a web of material positioned between the rolls and spanning and in contact with the tips of adjacent teeth.

FIG. 4 is an even further enlarged view of several interengaged teeth 22 and grooves 24 with a web 25 of material therebetween. As shown, a portion of web 25, which can be nonwoven web 5 shown in FIG. 1, is received between the interengaged teeth and grooves of the respective rolls. The interengagement of the teeth and grooves of the rolls causes laterally spaced portions of web 25 to be pressed by teeth 22 into opposed grooves 24. In the course of passing between the forming rolls, the forces of teeth 22 pressing web 25 into opposed grooves 24 impose within web 25 tensile stresses that act in the cross-web direction. The tensile stresses cause intermediate web sections 26 that lie between and that span the spaces between the tips 28 of adjacent teeth 22 to stretch or extend in a cross-web direction, which results in a localized reduction of the web thickness at each of intermediate web sections 26.

Although the portions of web 25 that lie between the adjacent teeth are locally stretched, the portions of the web that are in contact the tips of the teeth do not undergo a similar degree of extension. Because of the frictional forces that exist between the surfaces at the rounded outer ends of teeth 22 and the adjacent surfaces 28 of web 25 that are in contact with the tooth surfaces at the outer ends of the teeth, sliding movement of those portions of the web surfaces relative to the tooth surfaces at the outer ends of the teeth is minimized. Consequently, the thickness of web 25 at those areas of the web that are in contact with the surfaces of the tooth ends diminishes only slightly, as compared with the web thickness reductions that occur at intermediate web sections 26.

Figure 5:
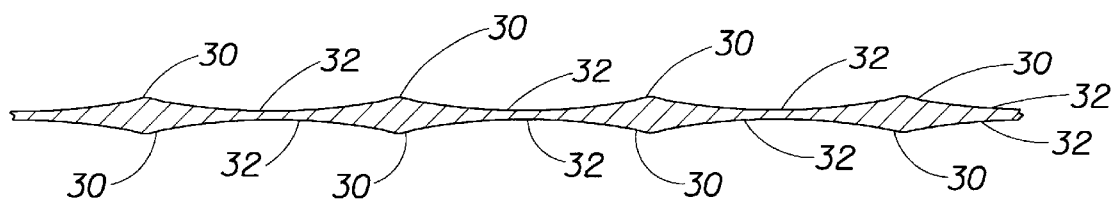
FIG. 5 is an enlarged, fragmentary, cross-sectional view taken along the cross-web direction of a web of material that has passed through a pair of forming rolls such as those shown in FIG. 2.

The action of pressing of portions of web 25 into the respective grooves 24 by teeth 22 therefore causes a non-uniform reduction of the thickness of web 25 to take place in the cross-web direction of the web. Accordingly, web 25 undergoes a greater reduction in thickness in the cross-web portions of the web that extend between and that span adjacent teeth 22 than it undergoes at those cross-web portions of the web that are in contact with the surfaces at the outer ends of teeth 22. Thus, by virtue of passing through the interengaged rolls and being locally laterally stretched at spaced intervals between adjacent teeth, the upper and lower surfaces of the web after it passes from between the opposed rolls define wavy surfaces that are the mirror images of each other when the web is viewed in cross section in the cross-web direction, as shown in FIG. 5. Wavy upper and lower surfaces of the web include alternating peaks 30 and valleys 32, which define alternating heavy and light basis weight regions. The light basis weight regions are found at the positions of the web wherein the web material has been locally laterally stretched. If the web as it exits from between forming rolls 8 and 9 is substantially flat, as shown in FIG. 5, and does not retain the sinusoidal or wavy form of web 25 as shown in FIG. 4 while the web is between the interengaged forming rolls, the localized stretching of the web in the cross-web direction results in a wider exiting web that has a plurality of spaced, longitudinally-extending, localized areas of reduced web thickness. Additional cross-web stretching of the exiting, formed web can be effected by passing the modified web between so-called Mount Hope rolls, tentering frames, angled idlers, angled nips, and the like (not shown), each of which is known to those skilled in the art.

Because of the localized cross-web stretching of web 25 that has taken place, with the consequent increase in web width, the web material that exits from the forming rolls at first forming station 6 has a lower basis weight than that of the entering web material, provided the exiting material remains in a substantially flat, laterally extended state. The laterally-stretched web as it exits from between the forming rolls may contract laterally to its original width, in that the web is placed under some tension in the web movement direction, in which case the exiting, modified web may have the same basis weight as it had in its entering condition. If, however, the exiting web is subjected to a sufficiently high web movement direction tension, the exiting web can be made to contract to a smaller width than its original width, in which case the web will have a greater basis weight than its original basis weight. On the other hand, if the web is subjected to sufficient additional cross-web stretching by passing the modified web between so-called Mount Hope rolls, tentering frames, angled idlers, angles nips, or the like as described above, the exiting, modified web will have less than its original basis weight. Thus, by selecting a suitable forming roll tooth and groove configuration, by selecting a suitable web movement direction tension level, and by selecting whether or not to subject the web to additional cross-web stretching, the resulting modified nonwoven web can have a web width that can range from about 25% to about 300% of the initial web width and a basis weight that is less than, equal to, or greater than the web's original basis weight.

Teeth 22 and grooves 24 can be generally triangular in cross section, as shown in FIG. 3, and preferably each of teeth 22 is of the same size so that each of the opposed teeth and grooves on respective forming rolls 8, 9 interengage with each other along the entire axial lengths of each of the rolls. Merely by way of example, and not by way of limitation, teeth having a peak-to-peak pitch of the order of about 0.150 inches, having sidewalls disposed at an included angle of the order of about 12°, and having a tip-to-base tooth height and groove depth of the order of about 0.300 inches can be employed in carrying out the present invention. As will be appreciated by those skilled in the art, the sizes of the respective teeth and grooves can be varied within a wide range and would still be effective to carry out the present invention. In that regard, additional structural details of suitable forming rolls are provided in U.S. Pat. No. 5,156,793, entitled "Method for Incrementally Stretching Zero Strain Stretch Laminate Sheet in a Non-Uniform Manner to Impart a Varying Degree of Elasticity Thereto," which issued on Oct. 20, 1992, to Kenneth B. Buell et al.; in U.S. Pat. No. 5,167,897 entitled "Method for Incrementally Stretching a Zero Strain Stretch Laminate Sheet to Impart Elasticity Thereto," which issued on Dec. 1, 1992, to Gerald M. Sheeter et al.; and in U.S. Pat. No. 5,518,801, entitled "Sheet Materials Exhibiting Elastic-Like Behavior," which issued on May 21, 1996, to Charles W. Chappell et al., the disclosures of each of which patents are hereby incorporated herein by reference.

If the nonwoven web is expanded only in the X-Y plane there will be a substantial decrease in the basis weight of the nonwoven web, which serves to reduce the cost of any components of which the rolled nonwoven web is a part. Preferably, for a fibrous nonwoven web in accordance with tire present invention, the width of the modified web is about 100% greater than its initial width before it is passed through the forming rolls. On the other hand, if the web movement direction tension on the web as it leaves the forming rolls is sufficiently high, the modified web will have a width that is less than its original width, and a greater basis weight than that of the original, unmodified web.

But if the exiting, modified nonwoven web retains the sinusoidal cross-sectional form shown in FIG. 4, the modified web will have been expanded into the Z plane and will have a greater thickness than the initial, unmodified web, which may advantageously impart improved softness to the web. Thus, the present invention also contemplates the production of a modified nonwoven web that also has been significantly expanded in a direction perpendicular to the X-Y plane, i.e., in the Z direction, either instead of dimensional modification in the X-Y plane or in addition to dimensional modification in the X-Y plane. In that regard, the modified nonwoven web can have a web thickness that ranges from about 85% to about 400% of the initial web thickness. Additionally, by appropriate selection of a low level of web movement direction tension and forming roll configurations which impart only a low level of localized cross-web stretching of web, a modified nonwoven web can be provided having an increased web thickness while simultaneously providing a decreased basis weight web, if desired.

Figure 6:
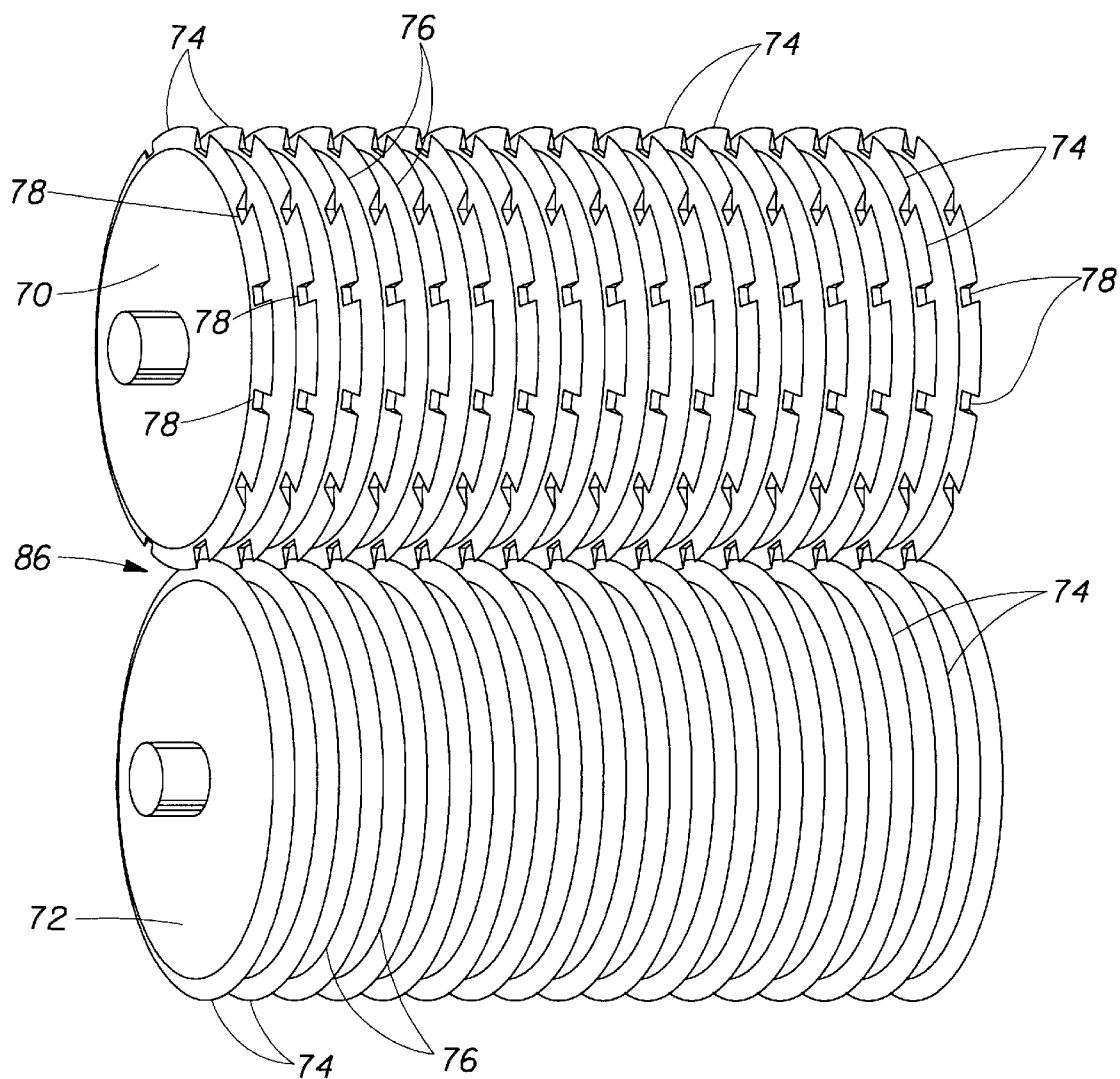
FIG. 6 is a view similar to FIG. 4, but showing forming rolls having an alternative form of tooth structure.
Figure 7:
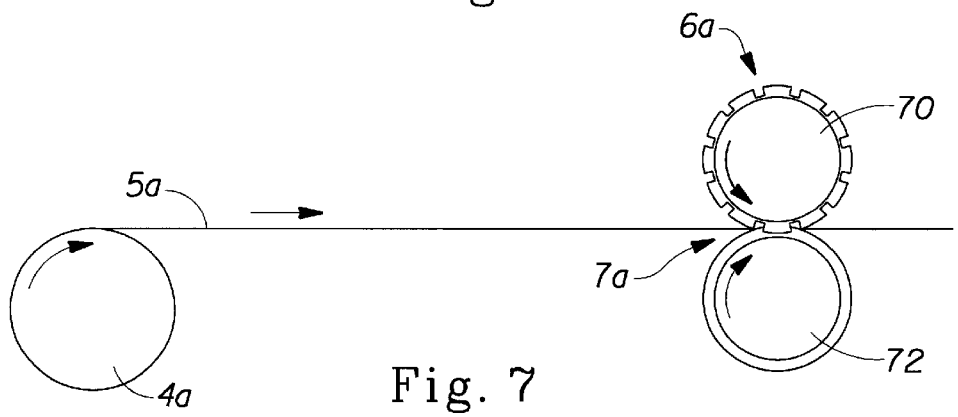
FIG. 7 is a view similar to FIG. 1, showing a forming station that includes the forming rolls shown in FIG. 6.

Referring to FIG. 6, there is shown another configuration of opposed forming rolls, one that can be specifically employed to expand portions of the nonwoven web in the web thickness dimension, by expanding portions of the web out of the X-Y plane into the Z-plane. As shown in FIG. 7, an unmodified nonwoven web 5a is fed from a supply roll 4a into the nip 7a of opposed forming rolls 70 and 72 defining forming station 6a. Roll 70 includes a plurality of circumferentially-extending, axially-spaced circumferential ridges or teeth 75. However, unlike continuous circumferential ridges 22 of forming roll 8 shown in FIG. 2, circumferential ridges 75 of roll 70 include a plurality of circumferentially-spaced toothed regions 74, and intervening circumferentially-spaced notched regions 78 that define recessed, open regions on ridges 75. As shown in FIG. 6, notches 78 on respective axially adjacent circumferential ridges 75 are aligned laterally to define a plurality of circumferentially-spaced groups of notched regions 78 about the periphery of roll 70. The respective laterally-extending groups of notched regions each extend parallel to the axis of roll 70.

Figure 2:
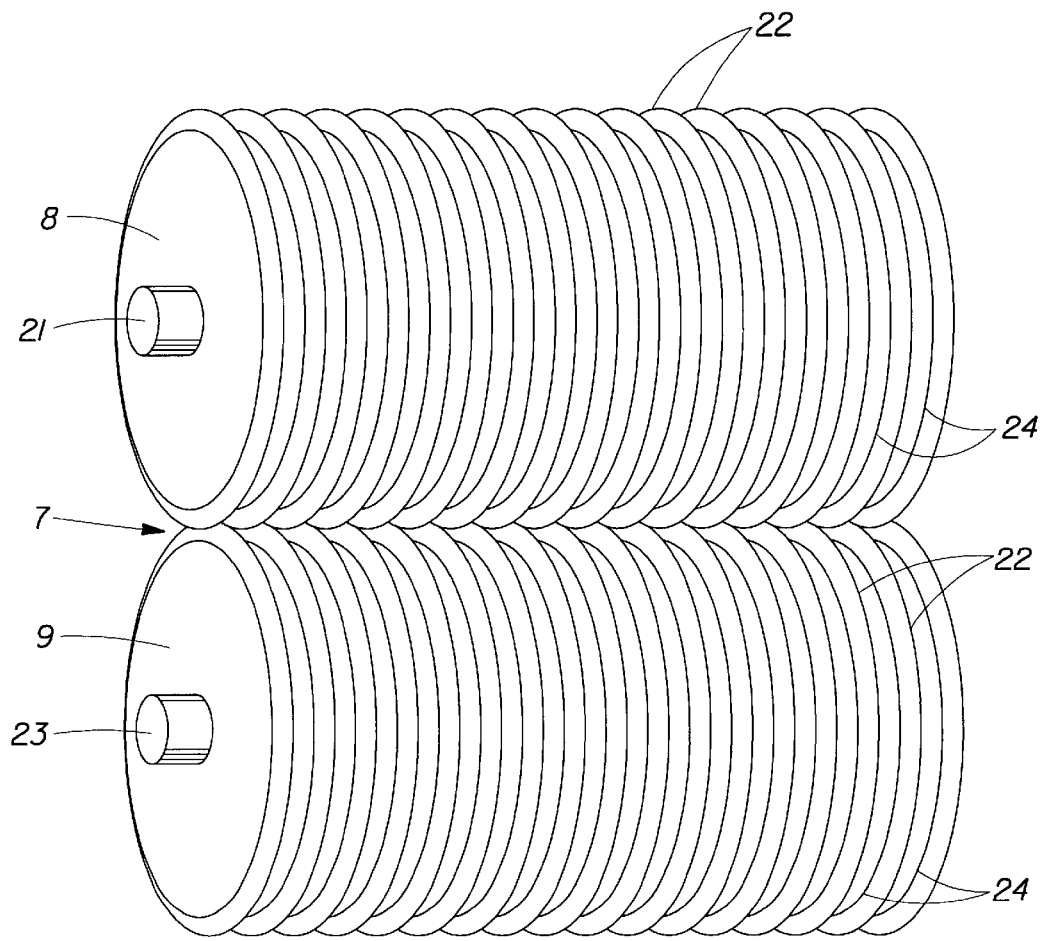
FIG. 2 is a fragmentary perspective view of a pair of closely-spaced forming rolls each having alternating and interengaging peripheral teeth and grooves and that can be utilized in carrying out the method aspects of the present invention.

Roll 72 is similar in overall construction to forming rolls 8 and 9 as shown in FIG. 2 in that roll 72 includes a plurality of circumferentially-extending, axially-spaced teeth 79 that extend in continuous, uninterrupted form about the circumference of the roll. Teeth 79 of roll 72 intermesh with teeth 75 of roll 70. But the portion of the nonwoven web that passes between the notched regions 78 of roll 70 and the teeth 79 of roll 72 will be unformed, i.e., the nonwoven web will not be deformed or stretched in that area and will remain substantially planar, while the portions of the web passing between toothed regions 74 of roll 70 and the teeth 79 of roll 72 will be deformed or stretched beyond the elastic limit of the nonwoven, resulting in a plurality of raised, rib-like elements.

Figure 8:
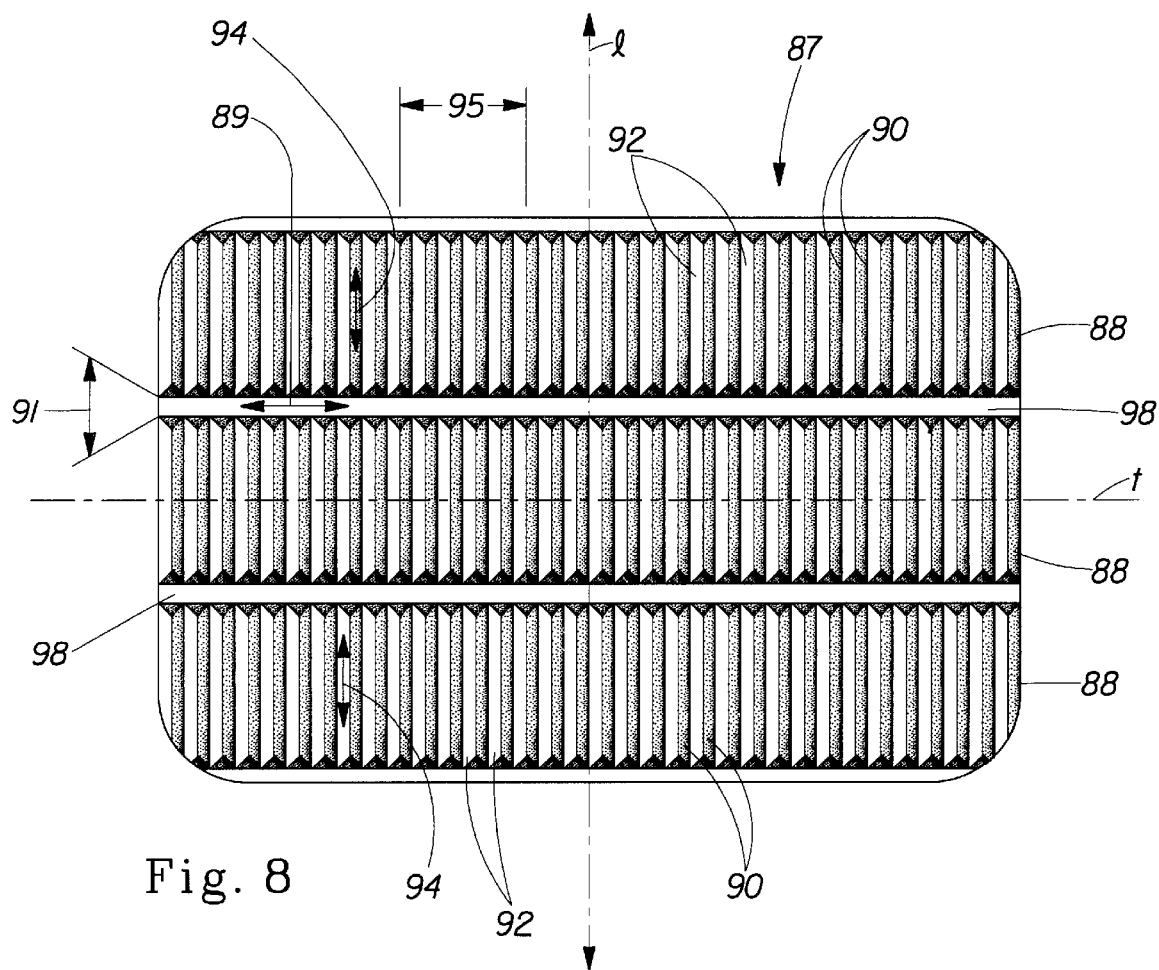
FIG. 8 is a top plan view of a web of material after it has passed between forming rolls having the tooth structure shown in FIG. 6.
Figure 9:
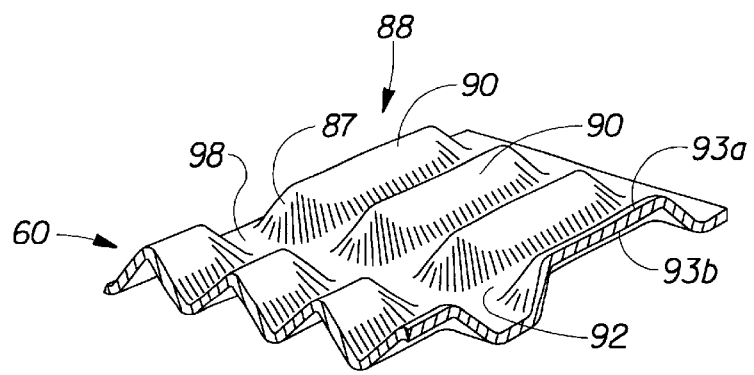
FIG. 9 is an enlarged, fragmentary perspective view of a portion of the web shown in FIG. 8.

Referring now to FIGS. 8 and 9, there is shown a portion of a nonwoven web 60 after it has passed between a pair of opposed, interengaged forming rolls 70 and 72 having the tooth configurations shown in FIG. 6. Nonwoven web 60 has two centerlines, a longitudinal centerline, which is also referred to hereinafter as an axis, line, or direction "l" and a transverse or lateral centerline, which is also referred to hereinafter as an axis, line, or direction "t". The transverse centerline "t" is generally perpendicular to the longitudinal centerline "l".

Nonwoven web 60 includes a network of distinct regions. The network includes at least a first region 98, a second region 92, and a transitional region 87, which is at the interface between the first region 98 and the second region 88. Web 60 also has a first surface 93A and an oppositely-facing second surface 93B. In the embodiment shown in FIGS. 8 and 9, nonwoven web 60 includes a plurality of substantially flat, longitudinally spaced first regions 98 and a plurality of alternating second regions 88.

First regions 98 have a first, transversely-extending axis 89 and a second, longitudinally-extending axis 91, wherein the first axis 89 is preferably longer than the second axis 91. The first axis 89 of the first region 98 is substantially parallel to the transverse axis of nonwoven web 60, while the second axis 91 is substantially parallel to the longitudinal axis of the web.

Second regions 88 have a first, transversely-extending axis 95 and a second, longitudinally-extending axis 94. The first axis 95 is substantially parallel to the transverse axis of the web, while the second axis 94 is substantially parallel to the longitudinal axis of the web. In the preferred embodiment of FIGS. 8 and 9, the first regions 98 and the second regions 88 are substantially linear, each extending continuously in a direction substantially parallel to the longitudinal axis of the web.

In the embodiment shown in FIGS. 8 and 9, first regions 98 are substantially planar. That is, the material within first regions 98 is substantially flat and is in substantially the same condition after the modification step undergone by nonwoven web 60 by passage between interengaged rolls 70 and 72 shown in FIG. 6 as it was in before the web was passed between the forming rolls.

Second regions 88 include a plurality of raised, rib-like elements 90 that have a first or major axis 94 that is substantially parallel to the longitudinal axis of the nonwoven web 60, and a second or minor axis 95 that is substantially parallel to the transverse axis of web 60. The dimension of rib-like elements 90 along first axis 94 is at least equal to, and preferably longer than, the dimension along second axis 95. Preferably, the ratio of the dimension of rib-like elements 90 along first axis 94 to the dimension along second axis 95 is at least 1:1, and more preferably at least 2:1 or greater. Further, rib-like elements 90 in second region 92 are adjacent one another and are separated from each other by an unformed area 99 having a width of less than about 0.10 inches, as measured perpendicular to the major axis 94 of the rib-like elements. The dimensions of the rib-like elements can also be varied, if desired. A more detailed description of a web having first and second regions as shown in FIGS. 8 and 9 is provided in U.S. Pat. No. 5,518,801, the disclosure of which has already been incorporated herein by reference.

Figure 10:
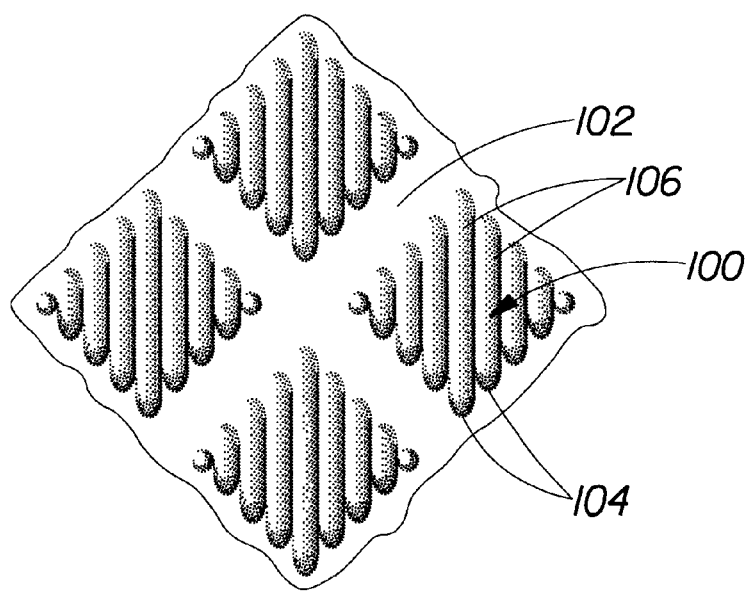
FIG. 10 is an enlarged fragmentary view of a portion of the surface of a forming roll having alternating teeth and grooves that define a diamond-like pattern.

In addition to the surface patterns illustrated in FIGS. 8 and 9 in the form of ridges and grooves, all of substantially equal lengths to define generally rectangular areas of deformation, the desired stretching or thinning of a nonwoven web can, if desired, be effected by other forming roll tooth and groove configurations that can cause localized stretching of the nonwoven material. For example, as shown in FIG. 10, instead of spaced rectangular arrays of ridges and grooves the deformation pattern can be in the form of ridges and grooves defining an array of spaced, diamond-shaped elements 100 with intervening undeformed areas 102. Each such diamond-shaped element is defined by alternating rib-like elements 106 and intervening grooves 104. Examples of methods and apparatus for formation of such diamond-shaped elements are disclosed in U.S. Pat. No. 5,650,214, entitled, "Sheet Materials Exhibiting Elastic-Like Behavior and Soft, Cloth-Like Texture", which issued on Jul. 22, 1997, to Barry J. Anderson, et al., the disclosure of which is incorporated herein by reference.

Figure 11:
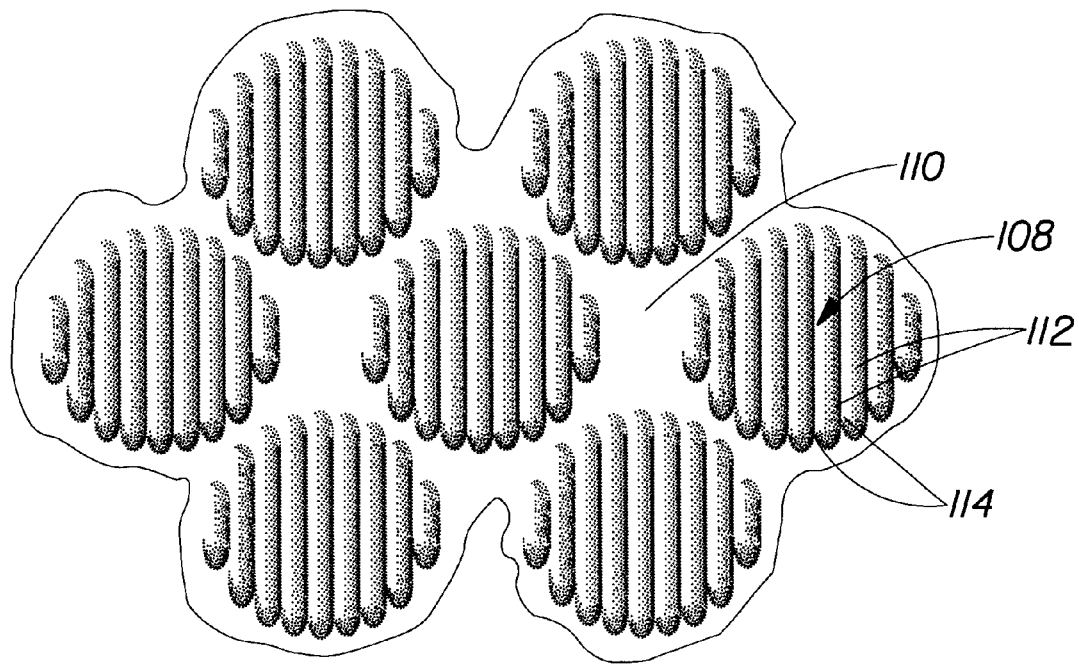
FIG. 11 is a fragmentary perspective view similar to that of FIG. 10, but showing another forming roll tooth and groove pattern.

As shown in FIG. 11, the deformation pattern can also be in the form of ridges and grooves that together define an array of spaced, circularly-shaped elements 108. Each such circular element can be defined by varying-length rib-like elements 114 and intervening grooves 112. Between respective circularly-shaped elements 108 are unformed intervening areas 110. As will be apparent to those skilled in the art, other deformation patterns can also be employed, if desired, such as those illustrated and described in U.S. Pat. No. 5,518,801, the disclosure of which was earlier incorporated herein by reference.

Another set of forming rolls, having a different arrangement of the peripheral teeth and grooves and that can be utilized in the practice of the present invention, is shown in FIGS. 12 through 15. Forming roll 150 is similar to forming roll 70 shown in FIG. 6 except that the circumferentially-extending teeth 75 are provided in respective groups 152, each group containing several teeth 75. Each of groups 152 of teeth 75 is spaced from an adjacent group of teeth in the axial direction of the roll, and the respective groups of teeth are separated by an intervening gap 154 that is devoid of teeth. Forming roll 72 of FIG. 12 has the same configuration as forming roll 72 of FIG. 6.

Figure 15:
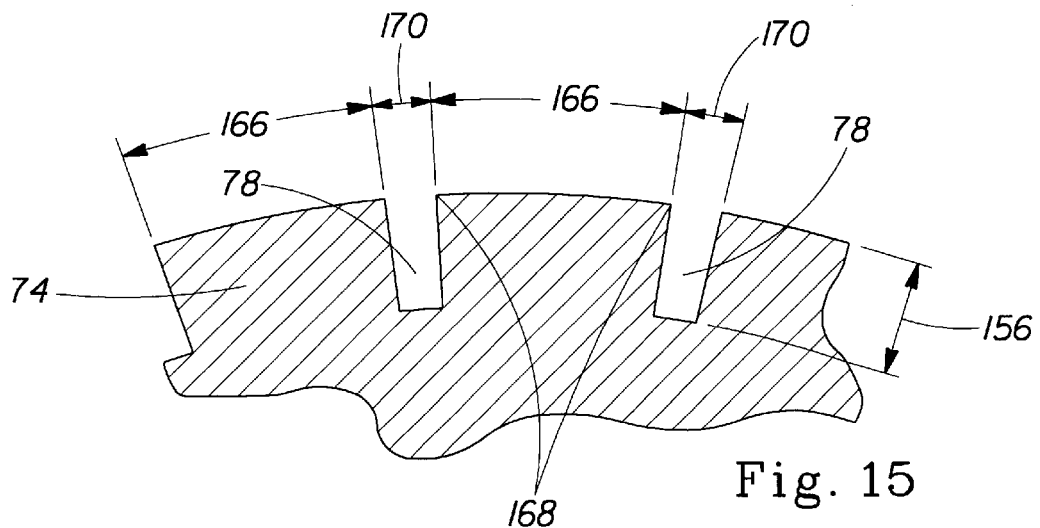
FIG. 15 is an enlarged, fragmentary side view of the tooth and groove configuration of the upper forming roll shown in FIG. 2.

Reference numerals that identify the various parameters of the teeth and grooves of the several forming roll configurations illustrated herein are shown in FIGS. 13 through 15. Because of the general structural similarity of the teeth and grooves on the several forming rolls shown in FIGS. 2, 6, and 12, the same reference numerals as are shown in FIGS. 13 through 15 apply to corresponding parts of the rolls shown in FIGS. 2, 6, and 12.

FIG. 13 is an enlarged, fragmentary, cross-sectional view of teeth 79 of roll 72 taken along a section line that is parallel with the axis of roll 72. The tooth height, which is also the height of the intervening grooves, is represented by 156, the tooth tip radius is represented by 158, and the pitch or spacing between adjacent teeth is represented by 160. FIG. 14 is an enlarged, fragmentary, cross-sectional view of roll 150 taken along a section line that is parallel with the axis of roll 150. The width of group 152 of teeth 74 is represented by 162, and the width of gap 154 is represented by 164. FIG. 15 is an enlarged, fragmentary, side view of the circumferential teeth of roll 150 taken along a section line that is perpendicular to the axis of the roll. The circumferential length of individual teeth 74 is represented by 166 and the end radii of teeth 74 is represented by 168. The circumferential length of notched regions 78 is represented by 170.

As was noted earlier herein, in addition to modifying the dimensions of a nonwoven web by extending the web, for example, in the X-Y plane to lower its basis weight, and by adding loft to the web in the Z direction to impart surface softness and cloth-like appearance, the present invention is also directed to modifying the physical properties of the nonwoven web in a beneficial way. As used herein the term "physical properties" refers to the performance characteristics of the web, including the strength of the Web when subjected to a tensile force, its elongation capability when subjected to a tensile force, and the force needed to elongate the web to a point short of tearing or rupture of the web material. Those desirable physical property modifications can be provided by passing the nonwoven web through at least one pair of the interengaged forming roll structures that have been described earlier herein, applying at least some degree of web-movement direction tension and, if desired, applying additional cross-web direction stretching as described previously. Additionally, the present invention also encompasses successive modifications of the nonwoven web by passing the web through successive sets of forming rolls, tensioning and, if desired, additional cross-web direction stretching. For example, a first set of forming rolls can serve to increase the elongation capability of the nonwoven web without causing shredding of the web into "pieces" or "strips," and a second set of forming rolls can serve to expand the web in the X-Y plane.

For some of the composite structural components that are incorporated in a disposable absorbent article and that include nonwovens, it is desirable that the cross-web (CD) strength of the modified nonwoven web be substantially lower than that of an unmodified web. For other components the cross-web elongation capability of a modified web is desirably substantially higher than that of an unmodified web, or the load to elongate is substantially lower, as compared with typical values attainable from commercially available, unmodified nonwoven webs that are made using either a carded, a spunbonded, or a spunbond/meltblown process. In that regard, it is desirable that a modified nonwoven web in accordance with the present invention exhibit a load to achieve 10% cross-web elongation of from about 5% to about 100% of the corresponding cross-web elongation load of the unmodified nonwoven web, that it exhibit a load to achieve 30% cross-web elongation of from about 5% to about 100% of the corresponding cross-web elongation load of the unmodified nonwoven web, and that it exhibit a cross-web elongation capability of from about 105% to about 200% of the cross-web elongation capability of the unmodified nonwoven web.

substantially lower CD tensile strength, that it be capable of elongation at lower CD tensile loads, and that it be capable of higher elongation. The provision of such physical characteristics in a modified nonwoven web prior to its attachment to a polymeric film enables the resulting composite nonwoven-film structure to be incrementally stretched at lower tensile forces, and without the formation of undesirable tears or large openings in the nonwoven element of the composite. Such a composite backsheet can thus more easily be conformed with and adapt to the contours of the body of a wearer of a disposable article, both during application of the article to the body as well as while being worn and being subjected to loads as a result of body movements of the wearer. The improved fit and adaptability to changing wearing conditions leads to greater wearer comfort.

EXAMPLES

Presented in Table I below and identified by Example numbers 1 through 7 are the physical property changes that resulted from the modification of three different nonwoven web materials by passing the webs between interengaged forming rolls having a particular tooth structure and size. The material for Examples 1 and 2 was a carded nonwoven that is identified by No. 16006942, obtained from FiberWeb North America, of Simpsonville, N.C. The material for Examples 3 and 4 was a composite, three-layer web of nonwoven materials (designated "SMS" in Table I) identified as Style No. 81350, obtained from PolyBond Company, of Waynesboro, Va., wherein the composite material included an inner layer of a meltblown nonwoven and outer layers of a spunbonded nonwoven overlying each of the faces of the inner layer. The material for Examples 5 through 7 was a spunbonded nonwoven material identified by No. 13561A and was also obtained from FiberWeb North America.

For each of the nonwoven starting materials, Table I identifies the type of nonwoven material, the initial basis weight, the initial strength to rupture, and the initial elongation characteristics, along with the initial web thickness. Table I also shows the results on each of the starting nonwoven materials of physical modification by passing the materials between opposed pairs of differently configured, interengaged forming rolls in accordance with the present invention.

TABLE I

| Example Number | Starting Material Description | Forming Roll Conditions | CD Strength (g/in.) | CD Elongation Capability (%) | CD Load To Elongate 10% (g/in.) | CD Load To Elongate 30% (g/in.) | Thickness (mils) |
|---|---|---|---|---|---|---|---|
|   | 27 gsm carded | Starting mat'l. | 1564 | 233 | 13 | 19 | 10 |
| 1 | ID #16006942 | "A" | 1495 | 256 | 15 | 18 | 19 |
| 2 | Fiber Web NA | "B" | 1641 | 265 | 7 | 10 | 30 |
|   | 25 gsm SMS | Starting mat'l. | 3038 | 118 | 45 | 87 | 9 |
| 3 | Style #81350 | "A" | 1103 | 225 | 9 | 13 | 47 |
| 4 | PolyBond | "B" | 1968 | 175 | 13 | 21 | 51 |
|   | 33 gsm Spun | Starting mat'l. | 3186 | 250 | 22 | 41 | 10 |
| 5 | ID #13561A | "A" | 2507 | 311 | 9 | 13 | 59 |
| 6 | Fiber Web NA | "B" | 2735 | 282 | 8 | 13 | 42 |
| 7 |   | "C" | 1816 | 261 | 5 | 6 | 16 |

For example, a modified nonwoven web can be utilized as a component of a composite, breathable backsheet, one that is liquid impervious but that is pervious to gases and moisture vapor and that preferably has at least one soft, cloth-like outer surface. However, when utilized in such a composite structure it is highly advantageous that the modified nonwoven component of such a backsheet have a Table II below sets forth the tooth and groove configurations and sizes for the several types of interengaged forming rolls (A, B, and C) that were employed in modifying the respective initial nonwoven webs to provide the examples of modified nonwoven webs that are identified in Table I. Forming rolls A of Table II have the external configurations shown in the respective upper and lower rolls as illustrated in FIG. 6; forming rolls B of Table II have the external configurations shown in the respective upper and lower rolls as illustrated in FIG. 12; and forming rolls C of Table II have the external configurations shown in the respective upper and lower rolls as illustrated in FIG. 2. Additionally, the three-digit numerals adjacent the respective individual tooth and groove parameters listed in Table II correspond with the reference numerals in FIGS. 13 through 15.

TABLE II

| | Forming Roll Description & Conditions | | | | |
|---|---|---|---|---|---|
| | A | | B | | C |
| | lower | Upper | Lower | Upper | Lower & |
| Tooth Pitch (in.) - 160 | 0.100 | 0.100 | 0.060 | 0.060 | 0.060 |
| Tooth Height (in.) - 156 | 0.250 | 0.250 | 0.100 | 0.100 | 0.115 |
| Tooth Length (in.) - 166 | Cont. | 1.000 | Cont. | 0.360 | Continuous |
| MD Band Spacing (in.) | — | — | — | 0.360 | — |
| MD Band Width (in.) - 164 | — | — | — | 0.060 | — |
| CD Band Width (in.) - 170 | — | 0.1250 | — | 0.060 | — |
| Tooth Tip Radius (in.) | 0.005 | 0.005 | 0.005 | 0.005 | 0.005 |
| Tooth End Radius (in.) | — | 0.0938 | — | 0.0938 | — |
| Roll Interengagement (in.) | 0.147 | | 0.069 | | 0.095 |
| MD Web Tension | <0.2 | | <0.2 | | 0.2–0.5 |

Examples 1 and 2 listed in Table I show the physical properties of a modified carded nonwoven web that result from passing the web between forming rolls having tooth structures and tooth sizes as listed under the designations A and B, respectively, in Table II. The web having the physical characteristics corresponding with Example 1 in Table I was formed by passing the initial carded nonwoven web between a pair of forming rolls having the configurations illustrated in FIG. 6 and having the tooth structure and tooth sizes, and having the roll engagement and the web movement direction (MD) web tension as set forth in column A of Table II. Similarly, the web having the physical characteristics corresponding with Example 2 of Table I was formed by passing the initial carded web between a pair of forming rolls having the configurations illustrated in FIG. 12 and having the tooth structure and sizes, and having the roll engagement and the web movement direction (MD) web tension as found in column B of Table II.

Examples 3 and 4 listed in Table I show the physical properties of a modified composite web of nonwoven materials, including layers of spunbonded/meltblown/spunbonded (SMS) materials, that results from passing the web between forming rolls having tooth structures and tooth sizes as listed under the designations A and B in Table II. The web having the physical characteristics corresponding with Example 3 in Table I was formed by passing the initial composite web of nonwoven materials between a pair of forming rolls having the configuration illustrated in FIG. 6 and having the tooth structure and tooth sizes, and having the roll engagement and the web movement direction (MD) web tension as set forth in column A of Table II. Similarly, the web having the physical characteristics corresponding with Example 4 of Table I was formed by passing the initial composite web of nonwoven materials between a pair of forming rolls having the configurations shown in FIG. 12 and having the tooth structure and sizes, and having the roll engagement and the web movement direction (MD) web tension as set forth in column B of Table II.

Examples 5, 6, and 7 listed in Table I show the physical properties of a modified spunbonded nonwoven web that results from passing the web between forming rolls having tooth structures and tooth sizes as listed under the designations A, B, and C in Table II. The web having the physical characteristics corresponding with Example 5 in Table I was formed by passing the initial spunbonded nonwoven web between a pair of forming rolls having the configurations shown in FIG. 6 and having the tooth structure and tooth sizes, and having the roll engagement and the web movement direction (MD) web tension as set forth in column A of Table II. Similarly, the web having the physical characteristics corresponding with Example 6 of Table I was formed by passing the initial spunbonded web between a pair of forming rolls having the configurations shown in FIG. 12 and having the tooth structure and sizes, and having the roll engagement and the web movement direction (MD) web tension as set forth in column B of Table II. And the web having the physical characteristics corresponding with Example 7 of Table I was formed by passing the initial spunbonded web between a pair or forming rolls having the configurations shown in FIG. 2 and having the tooth structure and the tooth sizes, and having the roll engagement and the web movement direction (MD) web tension as set forth in column C of Table II.

In connection with the physical characteristics of the respective modified nonwoven web materials identified in Table I, it is significant to note the changes in cross-web direction (CD) strength of the modified nonwovens. With the exception of the carded nonwoven material represented by Examples 1 and 2, the CD strength of each of the nonwoven webs decreased considerably as a result of the modification of the nonwoven material in accordance with the present invention. The CD strength decrease was greatest for the SMS material, ranging between 35.2% to 63.7%, while for the spunbonded nonwoven material it ranged between 14.2% to 43%. For the SMS material the CD strength decrease was greatest when the material was passed between forming rolls having the configuration illustrated in FIG. 6, and it was lowest when the material was passed between forming rolls having the configuration illustrated in FIG. 12. For the spunbonded material the CD strength decrease was greatest when the material was passed between forming rolls having the configuration shown in FIG. 2, and it was lowest when the material was passed between forming rolls having the configuration shown in FIG. 12.

The CD elongation capability of the nonwoven materials also increased for each of the materials, regardless of the forming roll configuration through which the nonwoven materials were passed. The greatest increase was, again, obtained when the materials were passed between forming rolls having the configuration illustrated in FIG. 6. Further, the modified SMS nonwoven material exhibited the greatest increase in CD elongation capability, ranging from 40% to 90%.

Finally, and again except for the carded nonwoven, the CD load to elongate by either 10% or 30% was remarkably reduced for the modified nonwoven materials that were subjected to the rolling procedures described herein. For both the SMS nonwoven material as well as the spunbonded material the CD load to elongate was reduced by from about 68% to about 85%. It can thus be seen that the physical properties of the respective nonwoven materials have been substantially altered after the nonwoven webs have passed between the forming rolls.

It will be appreciated by those skilled in the art that although the present disclosure has made reference to the use of grooved rolls, grooved plates can also be employed to carry out the method herein disclosed. In that regard, the disclosure in the previously-cited and previously-incorporated U.S. Pat. No. 5,518,801, Chappell et al., illustrates and describes a pair of flat plates having intermeshing teeth, and that can be utilized to effect the lateral extension of a flexible web or of polymeric material in the manner hereinbefore described. Similarly, although sometimes illustrated and described herein in the context of a continuous, moving web of material, the method herein disclosed can also be practiced utilizing materials in sheet form.

Furthermore, although the foregoing discussion has been presented in the context of modifying a nonwoven by local expansion of the material in the width dimension of a web, the benefits of the present invention can also be obtained by local expansion of the length (MD) dimension of such webs, instead of the width (CD) dimension. In that instance the forming rolls can have axially-extending teeth and grooves on their peripheral surfaces, rather than teeth and grooves that extend transversely of the roll longitudinal axis as shown in the forming roll structure illustrated in FIGS. 3 and 8. Accordingly, it is within the scope of the present invention to locally expand and modify the properties of a web either in the width (CD) dimension or in the length (MD) dimension interchangeably.

Modified nonwoven materials of the types represented by Examples 1 through 7 of Table I can be incorporated into various kinds of disposable absorbent articles, such as disposable diapers. As will be hereinafter described in greater detail, those materials can serve as the outer surface of a backsheet of such articles, as a topsheet, or as part of a stretchable component that has at least one soft, outer, cloth-like surface.

Joinder Nonwovem Web with Film

One example of a structural component of a disposable absorbent article with which a modified nonwoven web of the type hereinabove described can be utilized is the backsheet. That component is generally the outermost component of the article and provides imperviousness to the passage through the article of liquid body fluids or exudates that are intended to be absorbed by and retained in an inner, absorptive component of the article. A nonwoven modified in accordance with the present invention can be joined to one surface of a solid, liquid-impervious, polymeric film to provide a soft, cloth-like outer surface to the backsheet and to the article. Another embodiment of a backsheet can be provide desirable imperviousness to the passage of liquids, while permitting passage therethrough moisture vapor and also preferably air. A backsheet having those characteristics is preferably flexible, compliant, and has the desired soft, cloth-like outer surface, and can include a breathable polymeric film that is substantially impervious to liquids but pervious to moisture vapor and also preferably air.

Referring once again to FIG. 1, there is shown as another aspect of the present invention the joinder to one surface of a modified nonwoven web at joinder station 13 of a polymeric film 11 to provide a composite web 12 that can be utilized as a backsheet for a disposable absorbent article, such as a disposable diaper, or the like. Film 11 can be a polyolefin film, preferably a polyethylene film, and forms one layer of a composite backsheet that includes a liquid-impervious barrier film and at least one layer of a thin, modified nonwoven sheet that is attached to at least one surface of the film. Suitable polymers for films to be included in composite, disposable diaper backsheets in accordance with the present invention include thermoplastic polyolefins, such as polyethylene and polypropylene, and mixtures thereof. Various types of polyethylenes such as low density polyethylene, ultra-low density polyethylene, linear low-density polyethylene, and high-density polyethylene are suitable polyethylenes for backsheets. Other suitable thermoplastic polymers include polyesters, polyurethanes, compostable or biodegradable polymers, heat-shrinkable polymers, thermoplastic elastomers, and metallocene-catalyst-based polymers, for example those polymers available from Dow Chemical Company, of Midland, Michigan under the trademark INSITE, or available from the Exxon Chemical Company, of Bay City, Tex. under the trademark EXXACT.

A particularly suitable film 11 is a linear, low density polyethylene film that can have a thickness of from about 0.25 mils to about 5 mils, preferably a thickness of from about 0.25 mils to about 2.5 mils, and most preferably a thickness of from about 0.5 mils to about 1.5 mils. A particularly suitable commercially-available polyethylene film is identified as No. 97060401, made by the Clopay Corporation, of Cincinnati, Ohio, which is microporous and breathable. And although the ensuing discussion will be based upon polyethylene as the film material in the lamination, it will be appreciated by those skilled in the art that other synthetic polymers can also be employed in making a film that exhibits desired liquid-imperviousness, including other polyolefins, polypropylene, polyvinyl chloride, and the like, or blends or copolymers thereof. Suitable monolithic, breathable films are also contemplated, such as, for example, those employing polyurethane materials available from B.F. Goodrich & Company of Cleveland, Ohio under the trademark ESTANE and from Dow Chemical Company of Midland. Mich. under the trademark PELLETHANE, those employing polyamide materials available from Elf Atochem of Philadelphia, Pa. under the trademark PEBAX, and polyester materials available from E.I. duPont de Nemours & Company of Wilmington, Del. under the trademark HYTREL, from DSM Engineering Plastics of Evansville, Ind. under the trademark ARNITEL, and from Eastman Chemical Company of Kingsport, Tenn. under the trademark ECDEL. As used herein, "monolithic, breathable films" contemplates solid films through which moisture vapor transmission occurs primarily by activated diffusion through the films because of their molecular structure and molecular architecture, compared to microporous films through which moisture vapor transmission occurs primarily through apertures, voids or pores formed in the films. With such monolithic films, the vapors present on the side of the film having the highest concentration of such vapors dissolve into that surface and then diffuse through the film to the opposite surface where the vapors desorb and enter the surrounding environment.

Instead of a liquid-impervious and non-breathable film, as is frequently employed as a part of the backsheet of disposable diapers, or films that are substantially liquid-impervious but breathable as supplied, polymeric film 11 can advantageously be a precursor film that is impervious to liquids, gases, and moisture vapor, but that can be made to be breathable by suitable treatment of the film as described below. As used herein, the term "precursor" when applied to a polymeric film refers to a polymeric film that can be treated in such a way that micropores can be provided in the film to allow the film to be simultaneously breathable as well as liquid impervious. Additionally, as used herein, the term "breathable" refers to a film that is capable of permitting the passage therethrough of moisture vapor and also preferably air, but that does not permit the passage therethrough of liquids to an undesirable extent.

Imparting Breathability to a Precursor Film

Breathability can be imparted to a polymeric film, while maintaining its imperviousness to liquids, by forming micropores in the film. The desired micropores are sufficiently small in area to prevent the passage therethrough of liquids, but they allow the passage therethrough of air and moisture vapor. Micropores can be formed directly in an otherwise solid film in several ways, including perforating the film as disclosed in U.S. Pat. No. 3,881,489, entitled "Breathable, Liquid Impervious Backsheet for Absorbent Devices", which issued on May 6, 1975, to Edward Wallace Hartwell. Perforations can be provided by mechanically puncturing the film, but that technique requires close tolerance control over the puncturing elements of the apparatus, which over time might provide micropores of increasingly greater size as a result of mechanical wear of the puncturing elements. Larger micropores could allow the undesired passage of liquids through such films.

Another way to enable the formation of micropores in an otherwise impervious film involves substantially uniformly dispersing within a thermoplastic polymer matrix an incompatible inorganic or organic material. The dispersion of the incompatible material can be effected by a mixing step, and the resulting mixture can be formed into a thin film by extruding, casting, or blowing techniques that are known to those skilled in the art. As used herein, the term "incompatible" as applied to the inorganic or organic materials means materials that are incapable of being dissolved in the polymer, so that those materials retain their original form and composition and remain separate and distinct from, but are surrounded by, the polymer matrix. Formation of the micropores is effected after the film has been formed, by locally stretching the precursor film in a manner that will be described in greater detail hereinafter.

An example of an organic material that can be mixed with the thermoplastic polymer to permit the attainment of breathability of the film by post-film-formation processing is mineral oil, as disclosed in U.S. Pat. No. 4,609,584, entitled "Absorptive Devices," which issued on Sep. 2, 1986, to Cutler et al., the disclosure of which is incorporated herein by reference.

Examples of inorganic materials that can be mixed with the thermoplastic polymer to permit the attainment of breathability of the film by post-film-formation processing are calcium carbonate, clay, titanium dioxide, and mixtures thereof. Calcium carbonate is a preferred inorganic material from the standpoints of relatively low cost and of ready commercial availability. Preferably, the inorganic material is supplied in particulate form, having a particle size ranging from about 1 to about 5 microns, and it can constitute from about 5 to about 70 percent by weight of the polymer-particulate mixture. The inorganic material can optionally be coated with a fatty acid ester to enable higher loadings of the inorganic material to be included in the polymer-inorganic mixture. Suitable other inorganic materials are disclosed in U.S. Pat. No. 4,472,328, entitled "Process for Producing Porous Film or Sheet," which issued on Sep. 18, 1984, to Sugimoto et al., and in U.S. Pat. No. 4,777,073, entitled "Breathable Films Prepared From Melt Embossed Polyolefin/Filler Precursor Films," which issued on Oct. 11, 1988, to Sheth, the disclosures of each of which patents are incorporated herein by reference.

Mixing of the inorganic material and the thermoplastic polymer can be effected in any suitable mixing device, such as a mixing extruder, to obtain a substantially uniform mixture of the components. Preferably, the inorganic material is substantially uniformly dispersed throughout the polymeric material. A flexible precursor film having a thickness of the order of from abut 0.3 mils to about 5 mils can be formed from such a mixture using known film forming equipment and techniques. Before undergoing a breathability-imparting process, the polymer-particulate precursor film typically has an initial moisture vapor transmission rate (MVTR) of less than about 100 g/m$^2$/24 hr. and an oxygen permeation rate of less than about 0.5 m$^3$O$_2$/m$^2$/24 hr. The latter value is considerably less than the desired permeation values that can be obtained when a polymer-particulate precursor film undergoes the stretching and deformation processes hereinabove described.

In carrying out a method of making a composite, breathable, cloth-like backsheet in accordance with the present invention, breathability can be imparted to precursor film 11 before attachment of the film to modified nonwoven web 9a, subsequent to its attachment to the modified nonwoven web, or both prior to and, if desired, subsequent to its attachment to the nonwoven web. The precursor film and/or the precursor film/nonwoven composite can be activated at activation station 16 to provide breathability to the precursor film by passing the film or the composite between a pair of opposed, interengaged forming rolls 14, 17 having any of the roll structures and roll surface configurations generally described earlier herein and shown in FIGS. 2, 6, 10, 11, and 12. The passing between such forming rolls of the precursor film, or of the precursor film and nonwoven, can be repeated any number of times, and in any combination of the forming roll patterns hereinbefore described, until the desired composite web properties are attained.

Figure 16:
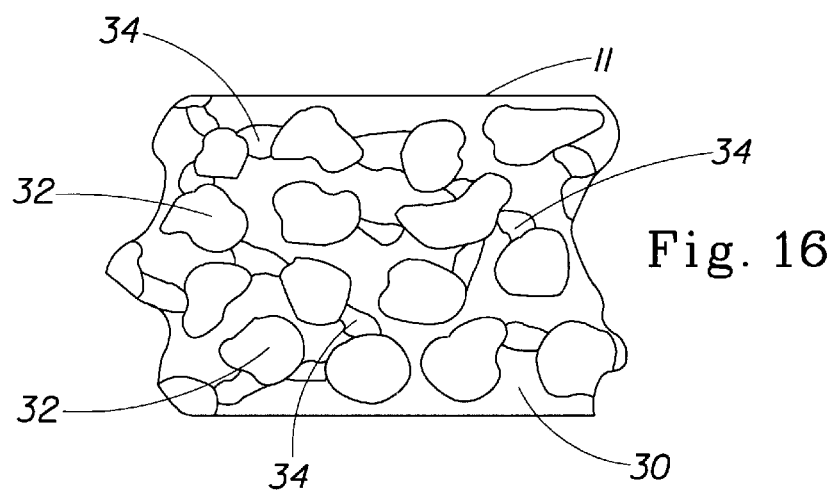
FIG. 16 is an enlarged, fragmentary, diagrammatic, cross-sectional view of a portion of a precursor film after it has passed through a pair of forming rolls, such as those shown in FIG. 2, to impart breathability to the film.
Figure 17:
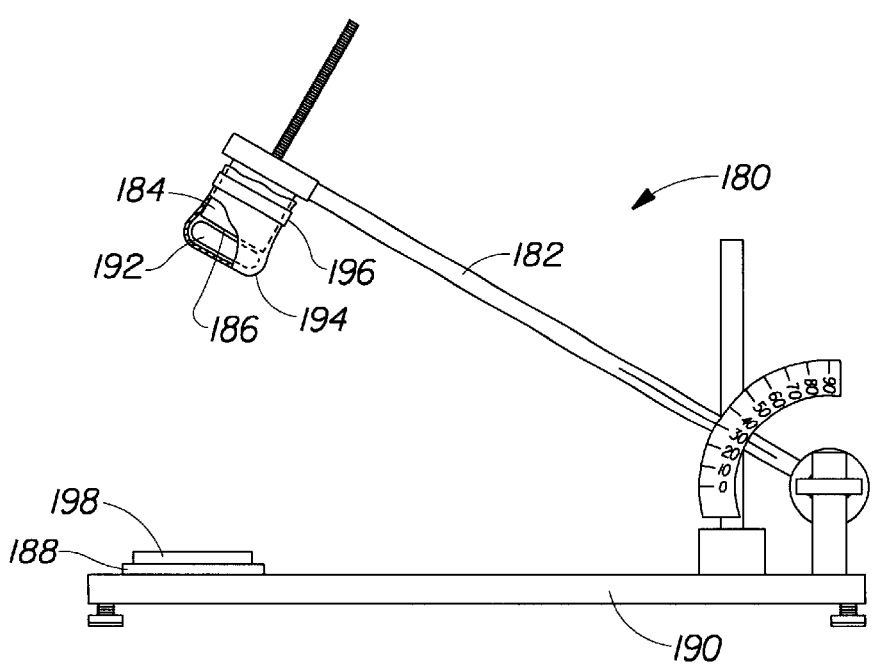
FIG. 17 is an elevational view of apparatus used in a method for determining the dynamic impact value of a material as an assessment of its perviousness to liquids when subjected to impact conditions.

When a precursor film is passed between forming rolls having roll surface configurations of any of the types previously described herein, sufficient localized stretching of the precursor film results in the formation of micropores in the film. In that regard, and referring to FIG. 16, which shows a precursor film after micropores have been formed, the polymeric component 30 of precursor film 11 is extensible to a certain degree without rupture, whereas the inorganic component 32 of the film is not extensible to any significant degree. Initially, polymeric component 30 provides a polymeric matrix that substantially completely surrounds and contacts the outer surfaces of inorganic components 32. When precursor film 11 is stretched by applying to it a tensile force, such as by passage of the film between interengaged forming rolls of the types hereinbefore described, the extensible polymeric component 30 of the film tends to be locally stretched. As a result, the polymeric component pulls away from and ultimately at least partially separates from some of the surfaces of the substantially inextensible inorganic particles 32 to cause the formation of a plurality of local voids or open areas 34 that are devoid both of the polymer and of the inorganic material. The separation occurs at portions of the interfaces between polymeric component 30 and the peripheral surfaces of inorganic particles 32, the bonds between which surfaces are relatively weak, to provide in precursor film 11 a large number of open areas 34 in the form of micropores. In that connection the micropores are irregularly configured and are irregularly distributed throughout the stretched areas of the film.

The micropores that are so developed by stretching precursor film 11 are of such a size that they are sufficiently large to permit passage through the film of air and moisture vapor, imparting the attribute of breathability to the film. However, preferably they are not so large as to allow the passage of liquids through the film. In that regard, the individual micropores preferably have a mean pore size of less than about 0.4 microns, so that imperviousness to liquids is not impaired, and more preferably a mean pore size of from about 0.1 microns to about 0.25 microns.

The distribution of open areas 34 is also preferably such that at least some of the open areas are in communication with other, adjacent open areas to define flow paths that extend through the film from one surface thereof to the other, to allow breathing to take place, in the sense of permitting the passage of air and moisture vapor, while substantially maintaining imperviousness of the film to the passage therethrough of liquids.

Joinder of Nonwoven Web and Precursor Film

The precursor material can be joined to the nonwoven material at joinder station 13 in a number of ways, including thermal lamination, adhesive lamination, direct lamination by extrusion, and vacuum lamination, each of which methods is well known to those skilled in the art. The precursor material can be a pre-formed film and can be activated, as previously described, to impart breathability at a time before it is joined with the nonwoven material. Preferably, however, precursor film 11 and modified nonwoven 9a are joined before the precursor film is made breathable, after which the resulting composite web 12 can be passed between suitable forming rolls at activation station 16 to locally stretch the precursor film and thereby provide breathability to the film component of the composite web. This allows the properties of the nonwoven web to be modified as desired without simultaneously undesirably effecting the structural integrity of the film and/or the composite.

The joinder of a non-fibrous polymeric film with a fibrous nonwoven web to form a composite web can be effected by heating either or both of the web or film to its softening temperature, and then pressing the web and film together lightly so that the web and film adhere to each other sufficiently to form a coherent, unitary, composite web upon cooling. Pressing can be performed at joinder station 13 shown in FIG. 1. Alternatively, instead of heating one or both the web or the film, the components of the composite web can be joined by applying to either of the materials a suitable adhesive, such as adhesive H2511, available from Findley Adhesives, Inc., of Milwaukee, Wis., and by then lightly pressing the materials together at joinder station 13 so that they adhere to each other sufficiently to form a coherent composite web after the adhesive sets. When adhesive is utilized to join the materials together, the adhesive is preferably applied to one or both of the materials in a discontinuous pattern, in order not to completely coat an unactivated precursor film, and in order not to fill all the micropores at the surface of a previously-activated precursor film.

As a further variant of the method of joining a polymeric precursor material with a nonwoven web, a layer of polymeric precursor material can be extrusion coated onto one of the surfaces of the nonwoven web. In that instance, because of the elevated temperature of the polymeric material as it exits from an extruder (not shown) onto the nonwoven web, the extruded material is sufficiently tacky so that it adheres to at least portions of the surface of the nonwoven web. If the temperature of the extruded material is sufficiently high, some melting of surface fibers of the nonwoven web can also take place, which upon cooling provides an even stronger bond between the polymeric precursor material and the nonwoven web.

In an another method, a polymeric precursor film can be applied to a surface of the modified nonwoven web by vacuum lamination of the precursor film material onto the modified nonwoven web.

The resulting composite web structure can then be passed between a pair of opposed, interengaging forming rolls 14, 17 at activation station 16. Such rolls can have a surface configuration and a structural arrangement similar to that of the forming rolls shown in FIG. 2. An additional rolling step can be employed, if desired, to expand the activated composite web 18 laterally, to further reduce its basis weight and thereby its cost per unit area. The shapes of the teeth and grooves, the spacing of the axes of the forming rolls, and the degree of interengagement of the opposed teeth and grooves of the second set of forming rolls are such that the cross-web width of the exiting composite web is preferably from about 10% to about 200% of that of the entering composite web, more preferably from about 10% to about 100%, and most preferably from about 10% to about 50%.

Test Methods

Components such as backsheets for disposable absorbent articles preferably have moisture vapor transmission rates, dynamic fluid impact values, and desirably oxygen permeation rates that fall within preferred ranges. The test methods for determining the values of those parameters for particular materials are described below.

Moisture Vapor Transmission Rate Determination

One measure of the breathability of a film or composite material is the perviousness of the film or composite to the passage of water vapor, reflected by the moisture vapor transmission rate (MVTR) of the film. In the case of disposable diapers, breathability can be imparted to, for example, a composite backsheet by the process hereinabove described, or by employing a film in the composite which already possesses such a quality, as also described hereinabove. In that regard, the MVTR of the composite material, such as a backsheet, is preferably from about 500 $g/m^2/24$ hr to about 5000 $g/m^2/24$ hr, more preferably from about 1000 $g/m^2/24$ hr to about 4000 $g/m^2/24$ hr, and most preferably from about 2000 $g/m^2/24$ hr to about 3000 $g/m^2/24$ hr.

The MVTR can be determined by placing a quantity of a hydrophilic material, such as calcium chloride, into a non-porous, open-top vessel (not shown) having an outwardly-extending flange around the vessel opening. A portion of the material for which the MVTR is to be determined is placed in overlying relationship relative to the vessel opening and is in contact with the flange of the vessel to completely cover the open end of the vessel. An annular gasket and an annular retaining ring are then placed over the material to be tested and are securely clamped to the vessel flange by any convenient clamping arrangement, to tightly and completely seal the periphery of the vessel opening in order that transmission of air or moisture vapor can only occur through the material under test. The resulting assembly is then weighed to determine the initial weight of the vessel and its contents.

After the initial weight has been determined, the assembly is placed in a chamber having a constant temperature (40° C.) and a constant humidity (75% relative humidity). The vessel is maintained under those atmospheric conditions for a period of five (5) hours, after which it is removed from the chamber, wrapped tightly with an impervious film to prevent transfer of moisture into and out of the vessel, and is allowed to reach thermal equilibrium with the ambient atmosphere in which the weigh balance is located. Thermal equilibrium is achieved in about 30 minutes, after which the film overwrap is removed from the vessel, which is again weighed to determine the final weight of the vessel and its contents.

The MVTR is calculated by the following formula, which provides the MVTR in $g/m^2/24$ hr:

$$MVTR = \frac{(FinalWt(gm) - InitialWt(gm)) \times 24.0}{Sample\ Area(sq.\ meters) \times 5.0\ hr.}$$

Oxygen Permeation Rate Determination

Another preferred attribute of a breathable film or a composite material is perviousness to the passage of air, which can be assessed by a test that measures the oxygen permeation rate. (OPR) of the material. When employed as a part of a component, such as a backsheet, of a disposable diaper, a breathable composite should preferably have an oxygen permeation rate of from about 2 $m^3 O_2/m^2/24$ hr. to about 20 $m^3 O_2/m^2/24$ hr, to allow ambient air to pass through the backsheet and into the diaper, in order to establish substantial thermal equilibrium between the atmosphere within the diaper and the ambient atmosphere. As a result, excessive heat buildup inside a diaper when worn is avoided, and wearer comfort is increased.

The OPR can be determined by providing a glass chamber having a circular mouth of about 12 cm diameter and including an inlet valve. An oxygen probe is placed within the chamber and is connected with an oxygen monitor (such as Cat. No. H-04406-10, available form Cole Parmer Instrument Co., of Vernon Hills, Ill.). A sample of the material for which the oxygen permeation rate is to be measured is provided in the form of a circle having a diameter of about 12 cm, to correspond substantially with the diameter of a 12 cm circular sample disc of aluminum foil (Part No. 025-493, available from Mocon, of Minneapolis, Minn.). A circle having a diameter of 2.54 cm is cut from the aluminum foil sample disc and is placed against the sample of the material to be tested.

The two discs (foil side up) are clamped to the opening of the sample container. An annular rubber gasket is then placed against the sample of material, without covering the opening in the foil sample disc. A second open-ended glass chamber, also having an inlet valve, and having an open end of substantially the same size as the open end of the sample chamber, is placed against the gasket and over the sample chamber, and is clamped to the sample chamber so that the foil disc and the sample material disc are positioned between the closed chambers.

Using the inlet valves of the chambers, each of the glass chambers is clushed with nitrogen to provide an initial oxygen concentration of 0.1% within the sample chamber. The second glass chamber is then removed so that one side of the material to be tested is exposed to air (20.9% oxygen). The times required to reach each of a predetermined series of oxygen concentrations within the sample chamber are recorded. The oxygen concentration values at which the times are recorded are in increments of 0.5%. The permeation rate of oxygen through the sample can then be calculated using the following formula:

$$OPR = \frac{Volume\ (ml) \times (8.63 \times 10^{-1})}{Average\ Time\ (sec)}$$

where $(8.63 \times 10^{-1})$ = a constant incorporating the slope of the oxygen transfer rate (time in minutes vs. % oxygen level change (0.5%)), 1% oxygen level of interest, conversion of minutes to days, and the surface area of the film sample ($5.0 \times 10^{-4}\ m^2$);

Volume = measured volume of the glass chamber containing the oxygen probe; and

Average time = average value of the time interval associated with a 0.5% increase in oxygen concentration.

Dynamic Fluid Impact Value Determination

When imparting a limited degree of moisture vapor, and also preferably air perviousness to a component such as a backsheet, it is important that the imperviousness of the component to liquids is not significantly diminished. And in addition to the desired attributes of imperviousness to liquids and perviousness to moisture vapor and preferably air when a component such as a backsheet is under no-load conditions, it is also desirable that substantial liquid imperviousness of the component be maintained even when the absorbent article is subjected to impact loads. Such loads can be imposed, for example, on a diaper backsheet when a baby wearing the diaper abruptly goes from a standing to a sitting position. In that regard, it is preferred that the perviousness to liquids under impact conditions be less than about 10 $g/m^2$, more preferably less than about 5 $g/m^2$, and most preferably less than about 2.5 $g/m^2$.

Perviousness of a material under impact conditions can be assessed by a test the measures the dynamic impact value of the material. As referred to herein, the "dynamic impact value" of a material is a value that is based upon the impact energy an average 20 lb. baby will impart to a saturated diaper if he or she falls or abruptly shifts from a standing position to a sitting position. Essentially, the dynamic impact value is a measure of the quantity of liquid that penetrates through a material under impact conditions.

Determination of the dynamic impact value for a particular material can be made by applying to the material an impact load of 20 Joules (14.75 ft-lb.) over an area of about 13.5 $in^2$, or 2300 Joules/$m^2$. Impact loading of a test specimen can be performed in a number of ways, such as by a device 180 shown in FIG. 20. Device 180 includes a pivotable lever 182 that has a weight 184 at its outer end. Weight 184 has an impact area of 0.00317 $m^2$ to contact a test specimen 186. To simulate the skin and body fat of a baby a foam impact pad 188 is positioned on base 190 of device 180 and opposite weight 184. A suitable foam pad is available from American Excelsior Corp., of Cincinnati, Ohio, and is a 1 in thick polyurethane foam pad undergoes 15.3% compression at a 1 psi. applied load. Impact pad 188 is preferably a crosslinked rubber foam pad, about 5 in. by 5 in., is carbon black filled, has a density of 0.1132 g/cm³, and has a thickness of 0.3125 in.

A wet diaper is simulated by providing a circular pad 192 in the form of a 2.5 in diameter section of CMC517 material available from Weyerhaeuser Inc. of Columbus, Miss. Pad 192 has a basis weight of 228 g/m², and a caliper of 0.127 in. measured under a 0.2 psi. load. The pad is saturated with simulated urine (Triton X-100, 0.0025% (wt/vol), surface tension of 30 dynes/cm, and available from Union Carbide Corp., of Danbury, Conn.) so that the saturated pad has a weight 10 times that of the dry pad.

Circular pad 192 is saturated and is held against the impact surface of weight 184 by the material 184 for which the impact perviousness is to be determined. In that regard, a 10 in. by 10 in. test sheet of material can be provided, with the outside surface of the material (i.e., that surface of the material which would be an outside surface of an absorbent article) facing downwardly. Material 194 is applied over pad 192 and is attached to the impact surface of weight 184 by a rubber band 196, or the like.

Weight 184 is adapted to impact a piece of dry filter paper 198, which can, for example, be a filter paper obtained from Whatman Inc, of Haverhill, MASS, (#2 filter paper, approximately 100 mm. diameter, Whatman Catalog No. 1002 150). The initial weight of the dry filter paper is determined, and the filter is placed in position on energy absorbing impact pad 188 that is positioned on base 190.

Weight 184 with its simulated diaper (saturated core 192 and overlying backsheet material 186) is dropped onto the filter paper from a height calculated to provide the desired impact load to the simulated diaper. Any liquid that passes through the material as a result of the impact is received on the filter paper. Weight 184 is permitted to remain in place on filter paper 198 for a period of 2 minutes after impact. Thereafter, the impacted filter paper is placed on a scale, and when three minutes from the time of impact have elapsed the weight of the impacted filter paper is determined. The dynamic impact value is calculated from the following formula:

$$DIV = \frac{\text{Filter Mass Change (grams)}}{\text{Impact Area (sq. meters)}}$$

EXAMPLE 8

Figure 18:
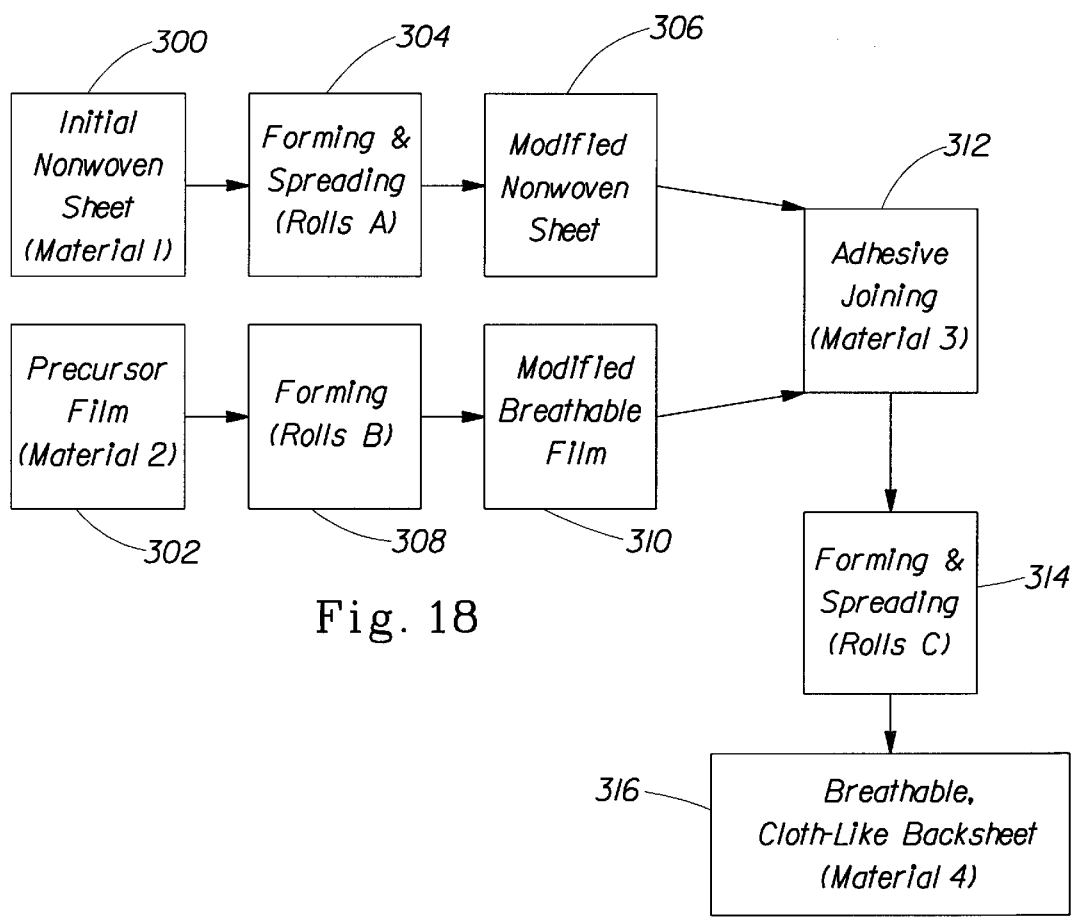
FIG. 18 is a flow chart showing the steps involved in preparing a breathable composite material, such as a backsheet, that includes a modified nonwoven material as one surface thereof.

A breathable, cloth-like composite sheet that can be incorporated into a disposable absorbent article as a breathable backsheet was prepared in accordance with the method steps shown in block diagram form in FIG. 18. The initial nonwoven web was a web of spunbonded polypropylene fibers, was obtained from FiberWeb North America, and was designated Type 13561A.20.0; the precursor film was a polyethylene material obtained from Clopay Plastics Corporation, Cincinnati, Ohio, and was designated Type P18-3931; and the adhesive with which the materials were joined after each had been modified was Type H-2031, obtained from Ato-Findley, of Wauwatosa, Wis., and was uniformly applied between the materials at the rate of 3.1 g/m².

Both the initial nonwoven web 300 (material 1) and the precursor film 302 (material 2) were separately modified by passing them between respective sets of forming rolls. Nonwoven web 300 was modified in a forming and spreading step 304 utilizing interengaged forming rolls having the tooth sizes and spacings shown in column A of Table III to provide a modified nonwoven web 306. Precursor film 302 was modified in an activating step 308 utilizing interengaged forming rolls having the tooth sizes and spacings shown in column B of Table III to provide a modified, breathable film 310. The modified materials were adhesively joined at step 312 to provide a composite web (material 3). After joinder the resulting composite web was subjected to a forming and spreading step 314 utilizing interengaged forming rolls having the tooth sizes and spacings shown in column C of Table III to provide a breathable, cloth-like backsheet 316.

TABLE III

|  | Forming Roll Description & Conditions | | |
|---|---|---|---|
|  | A | B | C |
|  | lower & | Lower   upper | Lower & up |
| Tooth Pitch (in.) | 0.060 | 0.100   0.100 | 0.060 |
| Tooth Height (in.) | 0.100 | 0.100   0.100 | 0.100 |
| Tooth Length (in.) | Cont. | Cont.   0.972 | Continuous |
| MD Band Spacing (in.) | — | —   — | — |
| MD Band Width (in.) | — | —   — | — |
| CD Band Width (in.) | — | —   0.0925 | — |
| Tooth Tip Radius (in.) | 0.005 | 0.005   0.005 | 0.005 |
| Tooth End Radius (in.) | — | —   0.094 | — |
| Roll Interengagement (in.) | 0.090 | 0.105 | 0.060 |
| MD Web Tension (lbs./linear | <0.2 | 0.2–.05 | 0.2–.05 |

The resulting composite, breathable, cloth-like backsheet had the following values of performance parameters of the type desired in backsheets for disposable absorbent articles:

| | |
|---|---|
| MVTR | 2900 g/m²/24 hr |
| Moisture Impact | 2.04 g/m² |
| O₂ Permeation | 11.1 m³O₂/m²/24 hr |
| Growth | 20% after forming and spreading step 316. |

Joiner of a Modified Nonwoven Web with Elastic Web

In addition to the combination of a modified nonwoven web with a polymeric film, as described earlier herein, a composite web can also be provided by joining a modified nonwoven web with a flexible web of material having some degree of elasticity. Because the modified nonwoven web is extensible and an elastomeric web is elastic, composite web structures that include both such components provide alternative materials that are elastic and that can be employed as extensible components of a disposable absorbent article.

Composite elastic materials can be used to provide backsheets and leg cuffs of disposable diapers. Additionally, they can also be used to provide localized stretchable elements of disposable diapers, such as elastic hip, waist, or leg panels, for improved fit and comfort of the articles. In order for such composite materials to function effectively in those capacities, it is preferred that the nonwoven component have as small a limiting effect as possible on the performance characteristics of the elastic component of the composite material. The elastic component is an important functional component of the composite material, significantly affecting the performance of the composite, whereas the nonwoven component is provided primarily for desired aesthetic effects, such as surface softness, cloth-like appearance, and also to provide to a composite elastic material a desirable surface coefficient of friction for the surfaces of the disposable article that come into contact with the wearer's skin and clothing.

Accordingly, the nonwoven component should have an elongation capability that is at least equal to the elongation required of the composite material during use of the article, including during application, wear, removal, and disposal. It is also desired that the nonwoven component have an elongation capability that is at least equal to the elongation to which the composite material is subjected during the manufacture of the article. More specifically, it is preferred that the elongation capability of the modified nonwoven web prior to attachment to an elastic web be in the range of from about 50% to about 200%, either in the web movement direction or in the cross-web direction.

In order to enable the composite elastic material to function most effectively, it is desirable that the force-elongation profile of the composite be as close as possible to that of the elastic component, to minimize any increase in the force-to-elongate of the composite, as compared with that of the elastic component alone. It is preferred that any increase in the force-to-elongate caused by the addition of the nonwoven component to the elastic component be less than about 40%, as compared with the elastic component alone at elongations between about 50% and about 200%. More preferably, the force increase is less than about 33%, and even more preferably the force increase is less than about 25%, again as compared with the elastic component alone at elongations between about 50% to about 200%. To ensure that the article is easy to apply and remove, and that it is also comfortable while being worn, it is preferred that the composite elastic material have a force-to-elongate of less than about 600 g/in at elongations between about 50% and about 200%. More preferably, the feorce to elongate is less than about 500 g/in, and even more preferably the force-to-elongate is less than about 400 g/in, all at elongations between about 50% and about 200%.

If the foregoing performance criteria are not met by the composite elastic material, the in-use performance of an article incorporating the material may be compromised. For example, application of a disposable diaper to a user will likely be rendered less convenient because of the greater effort necessary to stretch the composite elastic material during application. Additionally, it is also likely that poor fit of the disposable diaper may result because of the inability of the composite elastic material to elongate sufficiently to conform to the body of the wearer under usual wearing conditions and in response to body movements of the wearer. Even tearing of the nonwoven component can occur if the elongation capability of the nonwoven component is sufficiently exceeded during application or while the article is worn.

A modified nonwoven web and an elastic web can be joined to one another in surface-to-surface relationship, either at several intermittent points of surface contact or substantially continuously over at least a portion of their coextensive surfaces. The elastic component can be in either a tensioned or an untensioned condition, but preferably the modified nonwoven component is joined with the elastic component while the elastic component is in a substantially untensioned condition so that additional apparatus that would otherwise be necessary to hold the elastic component in tensioned condition during joinder is not needed. The modified nonwoven component can be joined to the elastic component after the nonwoven component has been removed from a takeup roll, or it can be joined to the elastic component immediately after having been subjected to modification of the type hereinbefore described.

The elastic component can be made from any suitable elastomeric material. Generally, any suitable elastomeric resins, or blends containing such resins, can be utilized for forming the elastomeric web. For example, the elastic component can be an elastomeric film made from block copolymers having the general formula A-B-A', where A and A' are each a thermoplastic polymer endblock that contains a styrenic moiety, such as a poly(vinyl arene) and where B is an elastomeric polymer midblock, such as a conjugated diene or a lower alkene polymer. Other suitable elastomeric webs, for example, can include polyurethane elastomeric materials, such is those available from B.F. Goodrich & Company of Cleveland, Ohio under the trademark ESTANE, those employing polyamide materials available from Elf Atochem of Philadelphia, Pa. under the trademark PEBAX, and polyester materials available from E.I. duPont de Nemours & Company of Wilmington, Del. under the trademark HYTREL, which are also noted hereinabove as being suitable materials for breathable films that are substantially impervious to liquids but pervious to moisture vapor.

A polyolefin can also be blended with an elastomeric resin to improve the processability of the combination. The polyolefin must be one that is extrudable, in blended form, along with the elastomeric resin. Useful blending polyolefin materials include polyethylene, polypropylene, and polybutene, as well as ethylene copolymers, polypropylene copolymers, and butene copolymers.

The elastic component can also be a pressure-sensitive elastomeric adhesive web. For example, the elastomeric material can itself be tacky or, alternatively, a compatible tackifying resin can be added to the extrudable elastomeric compositions described above, to provide an elastic component that can act as a pressure-sensitive adhesive to bond the elastic component to a modified nonwoven component. The elastic component can also be a multilayer material that can include two or more individual coherent webs or films. Additionally, the elastic component can be a multilayer material in which one or more layers contains a mixture of elastic and inelastic fibers or particles.

Other suitable elastomeric materials for use as the elastic component of a composite elastic element include "live" synthetic or natural rubber, elastomeric polyolefin metallocene catalyzed materials, heat-shrinkable elastomeric films, formed elastomeric scrim, elastomeric foams, or the like.

Figure 19:
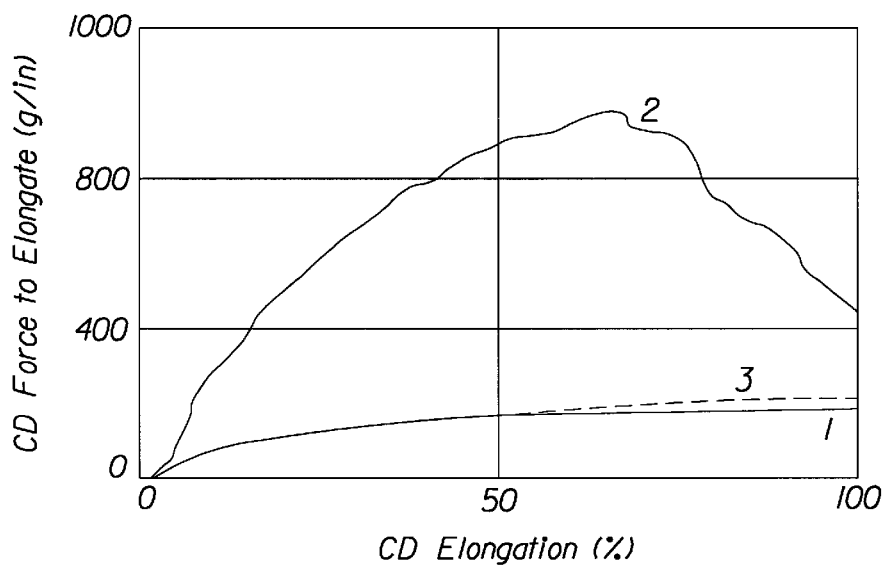
FIG. 19 is graph showing the force need to elongate several elastic materials to a particular elongation.

FIG. 19 illustrates the beneficial effect on the extensibility of a composite elastic material of modifying the nonwoven component or web of the composite before joining it with the elastic component. Each of the curves illustrated shows the tensile force that is necessary to elongate a given web to a particular degree of elongation in the cross-web direction. Curve 1 represents the elongation characteristics of an elastic web alone, in its "as received" condition and without any modification of any kind; curve 2 represents the elongation characteristics of a composite elastic material in which the same elastic web as in curve 1 and a nonwoven web have been adhesively joined, but neither of the individual components nor the composite has been modified in any way; and curve 3 represents the elongation characteristics of a composite material in which the same elastic web as in curves 2 and 3 has been adhesively joined with the same type of nonwoven web as in curve 2, but after the nonwoven web has first been modified by passage between a pair of forming rolls in the manner hereinbefore described to provide a modified nonwoven web. For each of curves 1 through 3 the elastic web is a vacuum formed elastic film identified by No. CLXIII-106-1, obtained from Tredegar Film Products, of Terre Haute, Ind., and the nonwoven web is a spunbonded polypropylene fiber nonwoven identified by No. FPN625, obtained from FiberWeb North America, of Simpsonville, S.C. The adhesive that was utilized to bond the elastic web, which was in a substantially untensioned condition, with the nonwoven web to form the composite materials reflected in curves 2 and 3 was obtained from Ato-Findley Adhesives, of Wauwatosa, Wis., identification No. H-2031, and was applied at the rate of 7.75 g/m². The nonwoven component was modified before joinder with the elastic component by passing it between a pair of interengaged forming rolls of the type shown in FIG. 2, the rolls each having the tooth sizes and processing conditions shown in Table IV below.

TABLE IV

| | Forming Roll Conditions | |
| --- | --- | --- |
| | Lower | Upper |
| Tooth Pitch (in.) | 0.060 | 0.060 |
| Tooth Height (in.) | 0.135 | 0.135 |
| Tooth Length (in.) | Continuous | Continuous |
| Tooth Tip Radius (in.) | 0.005 | 0.005 |
| Roll Interengagement | 0.075 | |
| MD Web Tension | 0.2–0.5 | |

As is apparent from FIG. 19, the joinder with an elastic web of an unmodified nonwoven web (curve 2) significantly alters the force to elongate of the composite material as compared with the elastic web alone. Although the elastic web by itself has the elongation characteristics represented by curve 1, the joinder to the elastic web of a relatively inextensible, unmodified nonwoven dramatically restricts the elongation capability of the composite material, as shown by curve 2, rendering the composite material less extensible, and requiring a considerably higher elongation force to obtain the same percent elongation as that of the base elastic web by itself. However, by modifying the nonwoven web in the manner taught herein, by passing the nonwoven web between a pair of interengaged, toothed forming rolls before joining the nonwoven with the elastic web, extensibility is imparted to the nonwoven web, and when the modified nonwoven web is joined with the elastic web, the composite material has virtually the same force-to-elongate versus percent elongation characteristic as does the elastic web alone, as shown by curve 3, which is almost coincident with curve 1. Thus, the maximum force-to-elongate of the composite that includes the modified nonwoven web is well within the preferred elongation force range of less than about 400 g/in, in the desired 50% to 200% elongation capability range. Accordingly, the composite material formed from the elastic plus the modified nonwoven exhibits the desired extensibility characteristics, thereby rendering such a composite material suitable for use as a backsheet, extensible panels, or other structural elements of disposable absorbent articles.

Modified Nonwovens as Disposable Diaper Components

As noted previously herein, composite structures including a modified nonwoven and made in accordance with the present invention can be advantageously utilized as a component of a disposable diaper. The ensuing discussion provides additional information relating to the structure of such articles. In that regard, and as used herein in the context of disposable absorbent articles, the term "absorbent article" refers generally to devices that absorb and contain body exudates. More specifically, it refers to devices that are placed against or in proximity to the body of a wearer to absorb and contain the various exudates discharged from the body.

As used herein, the term "disposable" means absorbent articles that are not intended to be laundered or otherwise restored or reused as an absorbent article (i.e., they are intended to be discarded after a single use and, preferably, to be recycled, composted, or otherwise disposed of in an environmentally compatible manner).

As used herein, the term "disposed" means that an element of a disposable absorbent article is formed (joined and positioned) in a particular place or position as a unitary structure with other elements of the article, or as a separate element joined to another element of the article.

As used herein, the term "joined" encompasses configurations wherein an element is directly secured to another element by affixing the element directly to the other element, and also configurations wherein a first element is indirectly secured to another element by affixing the first element to an intermediate member which, in turn, is affixed to the other element.

A "unitary" absorbent article refers to absorbent articles that are formed of separate parts that are united together to form a coordinated entity so that they do not require separate manipulative parts, such as a separate holder and liner.

Figure 20:
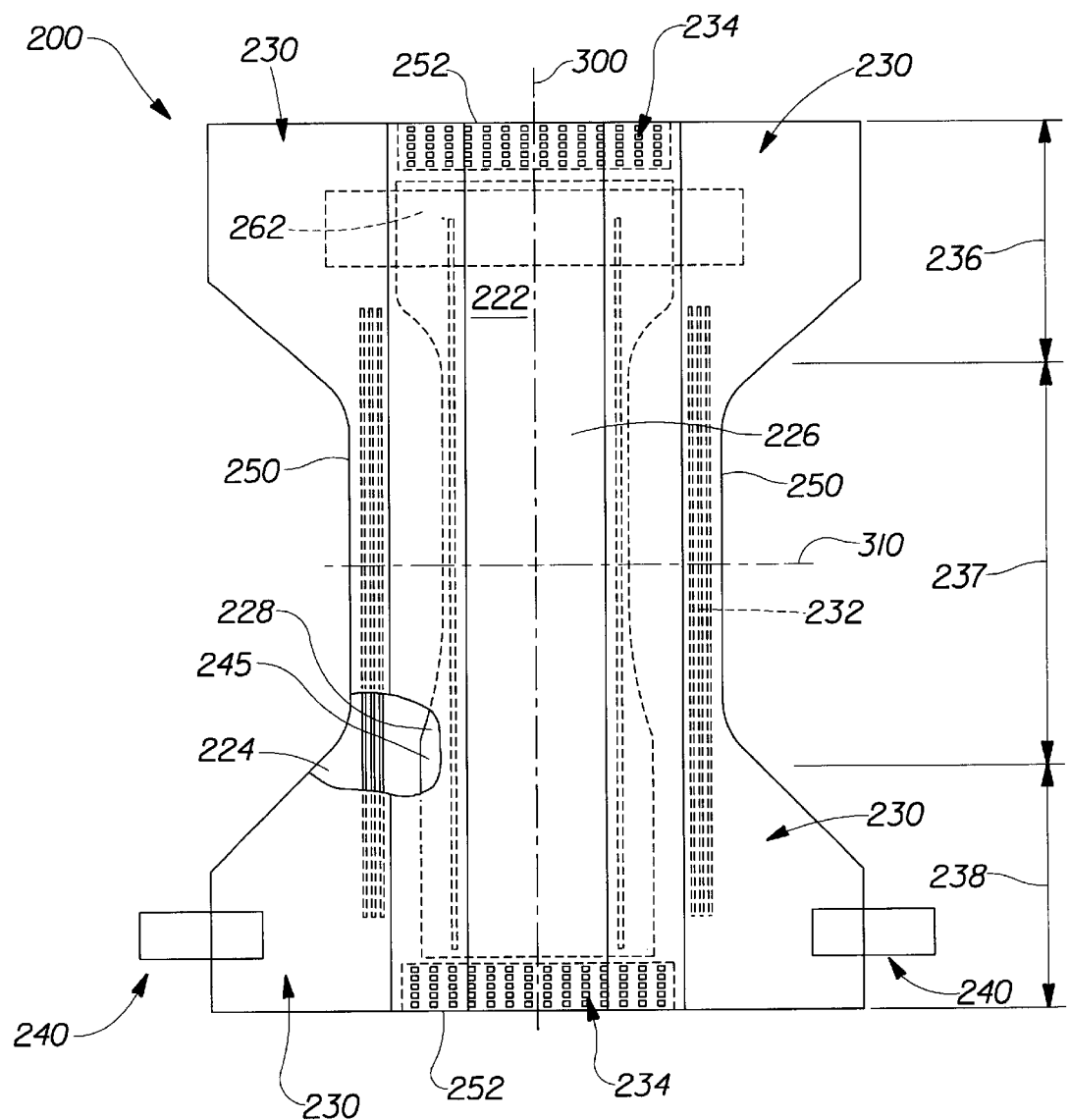
FIG. 20 is a plan view of a disposable diaper that includes structural components which incorporate a modified nonwoven web in accordance with the present invention.

An embodiment of a disposable absorbent article is shown in FIG. 20 in the form of disposable diaper 200. As used herein, the term "diaper" refers to an absorbent article generally worn about the lower torso by infants and incontinent persons. However, the present invention is also applicable to other forms of absorbent articles, such as incontinence briefs, incontinence undergarments, absorbent inserts, diaper holders and liners, pull-on diapers and training pants, feminine hygiene garments, and the like.

FIG. 20 is a plan view of diaper 200 while in a flat-out state, and with a portion of the structure broken away to more clearly show the overall construction of the article. As it is represented in FIG. 20, the portion of diaper 200 that faces the body of the wearer faces away from the viewer of that Figure, and the portion of the diaper that faces outwardly from the wearer, toward the wearer's outer garments, faces the viewer of FIG. 20. As shown, diaper 200 includes a liquid-pervious topsheet 224; a liquid impervious backsheet 226; an absorbent core 228, which is preferably positioned between at least a portion of topsheet 224 and backsheet 226; side panels 230; elasticized leg cuffs 232; an elastic waist feature 234; and a fastening system generally designated 240.

Diaper 200 has a first waist region 236, a second waist region 238 spaced from first waist region 236, and a crotch region 237 positioned between first waist region 236 and second waist region 238. The periphery of diaper 20 is defined by longitudinal edges 250 that extend generally parallel to the longitudinal centerline 300 of the diaper, and by end edges 252 that extend between longitudinal edges 250 and that are generally parallel to lateral centerline 310 of the diaper.

Diaper 200 includes a chassis 222 that defines the main body of the diaper. Chassis 222 includes at least a portion of absorbent core 228, and also preferably includes outer covering layers formed by topsheet 224 and backsheet 226. If the absorbent article includes a separate holder and a separate liner, chassis 222 generally also includes the holder and the liner. For example, a holder can include one or more layers of material to form an outer cover of the article, and a liner can include an absorbent assembly including a topsheet, a backsheet, and an absorbent core. In such cases, the holder and/or the liner can include a fastening element that is used to hold the liner in place throughout the time of use. For unitary absorbent articles, however, chassis 222 is the main structural component of the diaper, with other features added to form the overall diaper structure shown.

Although topsheet 224, backsheet 226, and absorbent core 228 can be assembled in a variety of well-known configurations, preferred diaper configurations are described generally in U.S. Pat. No. 3,860,003, entitled "Contractible Side Portions for Disposable Diaper," which issued to Kenneth B. Buell on Jan. 14, 1975; U.S. Pat. No. 5,151,092, entitled "Absorbent Article with Dynamic Elastic Waist Feature Having a Predisposed Resilient Flexural Hinge," which issued to Buell et al. on Sep. 29, 1992; U.S. Pat. No. 5,221,274, entitled "Absorbent Article with Dynamic Elastic Waist Feature Having a Predisposed Resilient Flexural Hinge," which issued to Buell et al. on Jun. 22, 1993; U.S. Pat. No. 5,554,145, entitled "Absorbent Article With Multiple Zone Structural Elastic-Like Film Web Extensible Waist Feature," which issued to Roe et al. on Sep. 10, 1996; U.S. Pat. No. 5,569,234, entitled "Disposable Pull-On Pant," which issued to Buell et al. on Oct. 29, 1996; U.S. Pat. No. 5,580,411, entitled "Zero Scrap Method For Manufacturing Side Panels For Absorbent Articles," which issued to Nease et al. on Dec. 3, 1996; and U.S. patent application Ser. No. 08/723,179, entitled "Absorbent Article With Multi-Directional Extensible Side Panels," filed Sep. 30, 1996 (allowed), in the name of Robles et al. The disclosures of each of the foregoing patents and patent application are incorporated herein by reference.

Backsheet 226 is generally that portion of diaper 200 that is positioned adjacent the garment facing surface 245 of absorbent core 228 and that serves to prevent body exudates that are absorbed and contained in absorbent core 228 from soiling articles that may come into contact with diaper 200, such as bedsheets and undergarments. In preferred embodiments, backsheet 226 is impervious to liquids (e.g., urine) and includes a thin, flexible, liquid-impervious plastic film, such as a thermoplastic film, having a thickness of about 0.012 mm (0.5 mil) to about 0.051 mm (2.0 mils). Suitable backsheet films include those manufactured by Tredegar Industries Inc. of Terre Haute, Ind., and sold under the designations X15306, X10962, and X10964.

Other suitable backsheet materials can include breathable materials that permit moisture vapor to escape from diaper 200 while still substantially preventing liquid exudates from escaping therefrom. Exemplary breathable materials can include the films and composite materials described hereinabove; woven webs; nonwoven webs; composite materials such as film-coated nonwoven webs; monolithic films; and, microporous films, including those manufactured by Mitsui Toatsu Co., of Japan, under the designation ESPOIR NO, and by EXXON Chemical Co., of Bay City, Tex., under the designation EXXAIRE. Suitable breathable materials in the form of polymer blends are available from Clopay Corporation, Cincinnati, Ohio, under the name HYTREL blend P18-3097. Breathable composite materials are also described in an International Patent Application published on Jun. 22, 1995, under Publication No. WO 95/16746, in the name of E. I. duPont de Nemours & Company, and in U.S. Pat. No. 5,865,823, entitled "Absorbent Article Having A Breathable, Fluid Impervious Backsheet" which issued to Currom on Feb. 2, 1999. Other breathable backsheets that include nonwoven webs and apertured formed films are described in U.S. Pat. No. 5,571,096, entitled "Absorbent Article Having Breathable Side Panels," which issued to Dobrin et al. on Nov. 5, 1996. The disclosures of each of those patents and publications are incorporated herein by reference.

Backsheet 226, or any portion thereof, can, if desired, be elastically extensible in one or more directions, as described earlier herein. In one embodiment, backsheet 226 can comprise a structural, elastic-like film ("SELF") web. A structural elastic-like film web is an extensible material that exhibits an elastic-like behavior in the direction of elongation without the use of added elastic materials. The SELF web includes a strainable network having at least two contiguous, distinct, and dissimilar regions. Preferably, one of the regions is configured so that it will exhibit resistive forces in response to an applied axial elongation in a direction parallel to the predetermined axis before a substantial portion of the other region develops significant resistive forces to the applied elongation. At least one of the regions has a surface-pathlength that is greater than that of the other region as measured substantially parallel to the predetermined axis while the material is in an untensioned condition. The region exhibiting the longer surface-pathlength includes one or more deformations which extend beyond the plane of the other region.

The SELF web exhibits at least two significantly different stages of controlled resistive force to resist elongation along at least one predetermined axis when subjected to an applied elongation in a direction parallel to the predetermined axis. In that regard, the SELF web exhibits first resistive forces to the applied elongation until the elongation of the web is sufficient to cause a substantial portion of the region having the longer surface-pathlength to enter the plane of applied elongation, whereupon the SELF web exhibits second resistive forces to further resist elongation. The total resistive forces to elongation are higher than the first resistive forces to elongation provided by the first region. In that regard, SELF webs suitable for use in diaper 200 are more completely described in U.S. Pat. No. 5,518,801, entitled "Web Materials Exhibiting Elastic-Like Behavior," which issued to Chappell, et, al. on May 21, 1996, the disclosure of which is incorporated herein by reference. In alternative embodiments, backsheet 226 can include elastomeric films, foams, strands, or combinations of these or other suitable materials, along with nonwovens or synthetic films.

Backsheet 226 can be joined to topsheet 224, to absorbent core 228, or to any other element of diaper 200 by any attachment means known in the art. For example, the attachment means can include a uniform continuous layer of adhesive, a patterned layer of adhesive, or an array of separate lines, spirals, or spots of adhesive. One preferred attachment means includes an open pattern network of filaments of adhesive as disclosed in U.S. Pat. No. 4,573,986, entitled "Disposable Waste-Containment Garment," which issued to Minetola et al. on Mar. 4, 1986. Other suitable attachment means include several lines of adhesive filaments that are swirled into a spiral pattern, as is illustrated by the apparatus and methods shown in U.S. Pat. No. 3,911,173, which issued to Sprague, Jr. on Oct. 7, 1975; U.S. Pat. No. 4,785,996, which issued to Ziecker, et al. on Nov. 22, 1978; and U.S. Pat. No. 4,842,666, which issued to Werenicz on Jun. 27, 1989. The disclosures of each of those patents are incorporated herein by reference. The backsheet (or the topsheet hereinafter described) can also be joined to the absorbent core at only certain locations, such as along a longitudinal stripe centered laterally on the core, or at one or both longitudinal ends of the core, or at other locations, so that the backsheet or topsheet can more easily stretch, if desired, outside the locations of joinder. The core may also be completely free of joinder to the topsheet or backsheet, and thus allowed to "float" between such components as they are extended, so as not to restrict the degree of stretch of the components.

Adhesives that have been found to be satisfactory for joining components of diaper 200 are manufactured by H. B. Fuller Company of St. Paul, Minn., and marketed as HL-1620 and HL-1358-XZP. Alternatively, the attachment means can include heat bonds, pressure bonds, ultrasonic bonds, dynamic mechanical bonds, or any other suitable attachment means, or combinations of those attachment means that are known in the art.

Topsheet 24 is preferably positioned adjacent the body-facing surface of absorbent core 228, and it can be joined thereto and/or to backsheet 226 by any attachment means known in the art. Suitable attachment means are described above within the context of joining backsheet 226 to other elements of diaper 200. In one preferred embodiment, topsheet 224 and backsheet 226 are joined directly to each other in some locations and are indirectly joined together in other locations by directly joining them to other elements of diaper 200.

Topsheet 224 is preferably compliant, soft-feeling, and non-irritating to the wearer's skin. Further, at least a portion of topsheet 224 is liquid pervious, permitting liquids to readily penetrate through its thickness to be received by absorbent core 228. A suitable topsheet 224 can be manufactured from a wide range of materials, such as porous foams; reticulated foams; apertured plastic films; or woven or nonwoven webs of natural fibers (e.g., wood or cotton fibers), synthetic fibers (e.g., polyester or polypropylene fibers), or a combination of natural and synthetic fibers. If topsheet 224 includes fibers, the fibers can be spunbonded, carded, wet-laid, meltblown, hydroentangled, or otherwise processed as is known in the art. One suitable topsheet material in the form of a web of staple length polypropylene fibers is manufactured by Veratec, Inc., a Division of International Paper Company, of Walpole, Mass., under the designation P-8.

Suitable formed film topsheets are described in U.S. Pat. No. 3,929,135, entitled "Absorbent Structures Having Tapered Capillaries," which issued to Thompson on Dec. 30, 1975; U.S. Pat. No. 4,324,246, entitled "Disposable Absorbent Article Having A Stain Resistant Topsheet," which issued to Mullane, et al. on Apr. 13, 1982; U.S. Pat. No. 4,342,314, entitled "Resilient Plastic Web Exhibiting Fiber-Like Properties," which issued to Radel, et al. on Aug. 3, 1982; U.S. Pat. No. 4,463,045, entitled "Macroscopically Expanded Three-Dimensional Plastic Web Exhibiting Non-Glossy Visible Surface and Cloth-Like Tactile Impression," which issued to Ahr, et al. on Jul. 31, 1984; and U.S. Pat. No. 5,006,394, entitled "Multilayer Polymeric Film," issued to Baird on Apr. 9, 1991. Other suitable topsheets can made in accordance with U.S. Pat. Nos. 4,609,518 and 4,629,643, which issued to Curro et al. on Sep. 2, 1986, and Dec. 16, 1986, respectively. Such formed films are available from The Procter & Gamble Company, of Cincinnati, Ohio, under the designation "DRI-WEAVE," and from Tredegar Corporation, of Terre Haute, Ind., under the designation "CLIFF-T." The disclosures of each of those patents are incorporated herein by reference.

Preferably, topsheet 224 is made of a hydrophobic material or is treated to be hydrophobic in order to isolate the wearer's skin from liquids contained in absorbent core 228. If topsheet 224 is made of a hydrophobic material, preferably at least the upper, body-facing surface of the topsheet is treated to be hydrophilic so that liquids will transfer through the topsheet more rapidly. Such treatment diminishes the likelihood that body exudates will flow off the topsheet rather than being drawn through the topsheet and being absorbed by the absorbent core. The topsheet can be rendered hydrophilic by treating it with a surfactant or by incorporating a surfactant into the topsheet. Suitable methods for treating the topsheet with a surfactant include spraying the topsheet material with the surfactant and immersing the material into the surfactant. A more detailed discussion of such treatments and of hydrophilicity is contained in U.S. Pat. No. 4,988,344, entitled "Absorbent Articles with Multiple Layer Absorbent Layers," which issued to Reising, et al. on Jan. 29, 1991; and in U.S. Pat. No. 4,988,345, entitled "Absorbent Articles with Rapid Acquiring Absorbent Cores," which issued to Reising on Jan. 29, 1991. A more detailed discussion of some suitable methods for incorporating surfactant in the topsheet can be found in U.S. Statutory Invention Registration No. H1670, published on Jul. 1, 1997, in the names of Aziz et al. The disclosures of each of those references are incorporated herein by reference.

As an alternative, topsheet 224 can include an apertured web or film that is hydrophobic. The hydrophobicity can be provided by eliminating the hydrophilizing treatment step from the production process and/or applying a hydrophobic treatment to the topsheet, such as a polytetrafluoroethylene compound like SCOTCHGUARD, available from 3M, of Minneapolis, Minn., or a hydrophobic lotion composition, as described below. In such embodiments, it is preferred that the apertures in the topsheet be large enough to allow the penetration of aqueous fluids like urine without significant resistance.

Additionally, any portion of topsheet 224 can be coated with a lotion having a composition that is known in the art. Examples of suitable lotions include those described in U.S. Pat. No. 5,607,760, entitled "Disposable Absorbent Article Having A Lotioned Topsheet Containing an Emollient and a Polyol Polyester Immobilizing Agent," which issued to Roe on Mar. 4, 1997; U.S. Pat. No. 5,609,587, entitled "Diaper Having A Lotion Topsheet Comprising A Liquid Polyol Polyester Emollient And An Immobilizing Agent," which issued to Roe on Mar. 11, 1997; U.S. Pat. No. 5,635,191, entitled "Diaper Having A Lotioned Topsheet Containing A Polysiloxane Emollient," which issued to Roe et al. on Jun. 3, 1997; and U.S. Pat. No. 5,643,588, entitled "Diaper Having A Lotioned Topsheet," which issued to Roe et al. on Jul. 1, 1997. The lotion can function alone or in combination with another agent as the hydrophobizing treatment described above.

The topsheet can also include or be treated with antibacterial agents, some examples of which are disclosed in International Patent Publication No. WO 95/24173, entitled "Absorbent Articles Containing Antibacterial Agents in the Topsheet For Odor Control," which was published on Sep. 14, 1995, in the name of Theresa Johnson. Additionally, topsheet 224, backsheet 226, or any portion of the topsheet or backsheet can be embossed and/or matte finished to provide a more cloth-like appearance.

Absorbent core 228 can include any absorbent material that is generally compressible, conformable, non-irritating to the wearer's skin, and capable of absorbing and retaining liquids, such as urine and other body exudates. Absorbent core 228 can be manufactured in a wide variety of sizes and shapes (e.g., rectangular, hourglass, "T"-shaped, asymmetric, etc.) and can include a wide variety of liquid-absorbent materials that are commonly provided in disposable diapers and in other absorbent articles, such as comminuted wood pulp, which is generally referred to as airfelt. Examples of other suitable absorbent materials include creped cellulose wadding; meltblown polymers, including coform; chemically stiffened, modified, or cross-linked cellulosic fibers; tissue, including tissue wraps and tissue laminates; absorbent foams; absorbent sponges; superabsorbent polymers; absorbent gelling materials; or any other known absorbent material, or combinations of such materials.

The configuration and construction of absorbent core 228 can also be varied. For example, the absorbent core or other absorbent structures can have varying caliper zones, a hydrophilic gradient, a superabsorbent gradient, or lower average density and lower average basis weight acquisition zones; or it can include one or more layers or structures. However, the total absorbent capacity of absorbent core 228 should be compatible with the design loading and the intended use of diaper 200.

Exemplary absorbent structures for use as the absorbent assemblies are described in U.S. Pat. No. 4,610,678, entitled "High-Density Absorbent Structures," which issued to Weisman et al. on Sep. 9, 1986; U.S. Pat. No. 4,673,402, entitled "Absorbent Articles With Dual-Layered Cores," which issued to Weisman et al. on Jun. 16, 1987; U.S. Pat. No. 4,834,735, entitled "High Density Absorbent Members Having Lower Density and Lower Basis Weight Acquisition Zones," which issued to Alemany et al. on May 30, 1989; U.S. Pat. No. 4,888,231, entitled "Absorbent Core Having A Dusting Layer," which issued to Angstadt on Dec. 19, 1989; U.S. Pat. No. 5,137,537, entitled "Absorbent Structure Containing Individualized, Polycarboxylic Acid Crosslinked Wood Pulp Cellulose Fibers," which issued to Herron et al. on Aug. 11, 1992; U.S. Pat. No. 5,147,345, entitled "High Efficiency Absorbent Articles For Incontinence Management," which issued to Young et al. on Sep. 15, 1992; U.S. Pat. No. 5,342,338, entitled "Disposable Absorbent Article For Low-Viscosity Fecal Material," which issued to Roe on Aug. 30, 1994; U.S. Pat. No. 5,260,345, entitled "Absorbent Foam Materials For Aqueous Body Fluids and Absorbent Articles Containing Such Materials," which issued to DesMarais et al. on Nov. 9, 1993; U.S. Pat. No. 5,387,207, entitled "Thin-Until-Wet Absorbent Foam Materials For Aqueous Body Fluids And Process For Making Same," which issued to Dyer et al. on Feb. 7, 1995; and U.S. Pat. No. 5,625,222, entitled "Absorbent Foam Materials For Aqueous Fluids Made From high Internal Phase Emulsions Having Very High Water-To-Oil Ratios," which issued to DesMarais et al. on Jul. 22, 1997. The disclosures of each of those patents are incorporated herein by reference.

Diaper 200 can also include at least one elastic waist feature 234 that helps to provide improved fit and retention. Elastic waist feature 234 is generally intended to elastically expand and contract to dynamically fit the wearer's waist. Elastic waist feature 234 preferably extends at least longitudinally outwardly from at least one waist edge 262 of absorbent core 228 and generally forms at least a portion of end edge 252 of diaper 200. Disposable diapers are often constructed to have two elastic waist features, one positioned in first waist region 236 and one positioned in second waist region 238. Further, elastic waist feature 234 or any of its constituent elements can include one or more separate elements affixed to diaper 200. Additionally, elastic waist feature 234 can be constructed as an extension of other elements of diaper 200, such as backsheet 226, topsheet 224, or both backsheet 226 and topsheet 224.

Elastic waist feature 234 can be constructed in a number of different configurations, including those described in U.S. Pat. No. 4,515,595, which issued to Kievit et al. on May 7, 1985; U.S. Pat. No. 4,710,189, which issued to Lash on Dec. 1, 1987; U.S. Pat. No. 5,151,092, which issued to Buell on Sep. 9, 1992; and U.S. Pat. No. 5,221,274, which issued to Buell on Jun. 22, 1993. Other suitable waist configurations can include waistcap features such as those described in U.S. Pat. No. 5,026,364, which issued to Robertson on Jun. 25, 1991, and in U.S. Pat. No. 4,816,025, which issued to Foreman on Mar. 28, 1989. The disclosures of each of the above-mentioned patents are incorporated herein by reference.

Diaper 200 can also include a fastening system 240. Preferably, fastening system 240 maintains first waist region 236 and second waist region 238 in at least a partially overlapped condition when the diaper is worn, to provide lateral tension about the circumference of the waist portion of diaper 200 to securely hold the diaper in the desired position on the body of the wearer. Fastening system 240 preferably includes tape tabs and/or hook and loop fastening components, although any other known fastening means are also acceptable. Some exemplary fastening systems are disclosed in U.S. Pat. No. 3,848,594, entitled "Tape Fastening System for Disposable Diaper," which issued to Buell on Nov. 19, 1974; U.S. Pat. No. 4,662,875, entitled "Absorbent Article," which issued to Hirotsu et al. on May 5, 1987; U.S. Pat. No. 4,846,815, entitled "Disposable Diaper Having An Improved Fastening Device," which issued to Scripps on Jul. 11, 1989; U.S. Pat. No. 4,894,060, entitled "Disposable Diaper With Improved Hook Fastener Portion," which issued to Nestegard on Jan. 16, 1990; U.S. Pat. No. 4,946,527, entitled "Pressure-Sensitive Adhesive Fastener And Method of Making Same," which issued to Battrell on Aug. 7, 1990; and the hereinbefore-referenced U.S. Pat. No. 5,151,092, which issued to Buell on Sep. 9, 1992, and U.S. Pat. No. 5,221,274, which issued to Buell on Jun. 22, 1993. The fastening system can also provide a means for holding the article in a disposal configuration as disclosed in U.S. Pat. No. 4,963,140, which issued to Robertson et al. on Oct. 16, 1990. The disclosures of each of those patents are incorporated herein by reference. In alternative embodiments, opposing sides of the garment can be seamed or welded to form a pant. This allows the article to be used as a pull-on type diaper, such as a training pant.

Diaper 200 can also include side panels 230 that can be elastic or extensible to provide a more comfortable and contouring fit. Such side panels initially conformably fit diaper 200 to the wearer and can sustain that fit throughout the time of wear, and preferably beyond a time when the diaper 200 has been loaded with exudates. In that regard, elasticized side panels 230 allow the sides of diaper 200 to expand and contract, and they can also permit more effective application of diaper 200 because even if the diaperer pulls one elasticized side panel 230 farther than the other during application, diaper 200 will "self-adjust" after application and during wearing.

Although diaper 200 preferably has side panels 230 disposed in second waist region 238, it can be provided with side panels 230 disposed in first waist region 236, or in both first waist region 236 and second waist region 238. Side panels 230 can be constructed in any suitable configuration. Examples of diapers having elasticized side panels are disclosed in U.S. Pat. No. 4,857,067, entitled "Disposable Diaper Having Shirred Ears," which issued to Wood, et al. on Aug. 15, 1989; U.S. Pat. No. 4,381,781, which issued to Sciaraffa, et al. on May 3, 1983; U.S. Pat. No. 4,938,753, which issued to Van Gompel, et al. on Jul. 3, 1990; the hereinbefore-referenced U.S. Pat. No. 5,151,092, which issued to Buell on Sep. 9, 1992, and U.S. Pat. No. 5,221,274, which issued to Buell on Jun. 22, 1993; U.S. Pat. No. 5,669,897, entitled "Absorbent Articles Providing Sustained Dynamic Fit," which issued to LaVon, et al. on Sep. 23, 1997; and U.S. patent application Ser. No. 08/723,179, entitled "Absorbent Article With Multi-Directional Extensible Side Panels," filed Sep. 30, 1996 (allowed), in the names of Robles, et al. The disclosures of each of the foregoing patents and patent application are incorporated herein by reference.

Diaper 200 preferably further includes leg cuffs 232, which provide improved containment of liquids and other body exudates when the diaper is worn. Such leg cuffs can also be referred to as leg bands, side flaps, barrier cuffs, or elastic cuffs. U.S. Pat. No. 3,860,003 describes a disposable diaper that provides a contractible leg opening having a side flap and one or more elastic members to provide an elasticized leg cuff (sometimes referred to as a gasketing cuff). U.S. Pat. Nos. 4,808,178 and 4,909,803, which issued to Aziz et al. on Feb. 28, 1989, and Mar. 20, 1990, respectively, describe disposable diapers having "stand-up" elasticized flaps (barrier cuffs) that improve containment at the leg regions. U.S. Pat. Nos. 4,695,278 and 4,795,454, which issued to Lawson on Sep. 22, 1987, and to Dragoo on Jan. 3, 1989, respectively, describe disposable diapers having dual cuffs, including gasketing cuffs and barrier cuffs. In some embodiments, it may be desirable to treat all or a portion of the leg cuffs with a lotion, as described above. Embodiments of diaper 200 can also include pockets for receiving and containing waste, spacers which provide voids for waste, barriers for limiting the movement of waste in the article, compartments or voids that receive and contain waste materials deposited in the diaper, and the like, and any combinations thereof. Examples of pockets and spacers for use in absorbent products are described in U.S. Pat. No. 5,514,121, entitled "Diaper Having Expulsive Spacer," which issued to Roe et al. on May 7, 1996; U.S. Pat. No. 5,171,236, entitled "Disposable Absorbent Article Having Core Spacers," which issued to Dreier et al on Dec. 15, 1992; U.S. Pat. No. 5,397,318, entitled "Absorbent Article Having A Pocket Cuff," which issued to Dreier on Mar. 14, 1995; U.S. Pat. No. 5,540,671, entitled "Absorbent Article Having A Pocket Cuff With An Apex," which issued to Dreier on Jul. 30, 1996; International Patent Application Publication No. WO 93/25172, published Dec. 3, 1993, entitled "Spacers For Use In Hygienic Absorbent Articles And Disposable Absorbent Articles Having Such Spacer"; and U.S. Pat. No. 5,306,266, entitled "Flexible Spacers For Use In Disposable Absorbent Articles," issued to Freeland on Apr. 26, 1994.

Examples of diapers having compartments or voids are disclosed in U.S. Pat. No. 4,968,312, entitled "Disposable Fecal Compartmenting Diaper," which issued to Khan on Nov. 6, 1990; U.S. Pat. No. 4,990,147, entitled "Absorbent Article With Elastic Liner For Waste Material Isolation," which issued to Freeland on Feb. 5, 1991; U.S. Pat. No. 5,062,840, entitled "Disposable Diapers," which issued to Holt et al on Nov. 5, 1991; and U.S. Pat. No. 5,269,755, entitled "Trisection Topsheets For Disposable Absorbent Articles And Disposable Absorbent Articles Having Such Trisection Topsheets," which issued to Freeland et al on Dec. 14, 1993.

Examples of suitable transverse barriers are described in U.S. Pat. No. 5,554,142, entitled "Absorbent Article Having Multiple Effective Height Transverse Partition," which issued Sep. 10, 1996, in the name of Dreier et al.; International Patent Publication No. WO 94/14395, entitled "Absorbent Article Having An Upstanding Transverse Partition," which was published Jul. 7, 1994, in the name of Freeland, et al.; and U.S. Pat. No. 5,653,703, entitled "Absorbent Article Having Angular Upstanding Transverse Partition," which issued Aug. 5, 1997, to Roe, et al. The disclosures of each of the above-identified references relating to pockets, compartments, and transverse barriers are incorporated herein by reference.

As noted earlier herein, a nonwoven fibrous web that has been modified in accordance with the present invention can advantageously be incorporated as a functional component of a disposable absorbent article, such as a disposable diaper. For example, a modified nonwoven by itself can serve as the porous topsheet 224 of diaper 200 shown in FIG. 20. Such a topsheet provides a soft, conformable, fluid-pervious overlay for absorbent core 228.

A modified nonwoven can also be employed as a component of a composite backsheet, such as backsheet 226 shown in FIG. 20. The backsheet can be a composite backsheet formed from a modified nonwoven web joined with a flexible, impervious film. The nonwoven can be the outwardly-facing surface of the diaper for softness and cloth-like external appearance, and the impervious film can provide a barrier to prevent absorbed waste matter from contacting the clothing worn by a user, or from contacting bedding if worn by a user while sleeping.

Instead of a backsheet 226 that includes an impervious film, the backsheet can be pervious to moisture vapor, preferably pervious to air, and also substantially impervious to liquids, as hereinabove described. For example, a breathable film or a precursor film that is thereafter rendered breathable can be joined with a modified nonwoven, as described earlier herein. A breathable backsheet can provide a barrier to the passage of liquids through the backsheet while allowing the passage of moisture vapor, and preferably air, which increases the comfort to the wearer by enabling the reduction of the relative humidity level inside the diaper as it is worn.

Finally, a modified nonwoven can be joined with an elastomeric web to provide a composite web that can serve as an elastic component for a disposable diaper, such as elastic waist feature 234 shown in FIG. 20. The portion of the elastic waist feature that faces and contacts the skin of the wearer can have a soft, cloth-like outer surface defined by the nonwoven component, and the elastic composite web may be breathable. Additionally, such elastomeric composite webs can also be utilized to provide elastic side panels 230 and elastic leg cuffs 232.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A method for modifying a pre-formed, nonwoven fibrous web, said method comprising the steps of:

a. feeding in a web movement direction to a pair of opposed, interengaged forming rolls a substantially untensioned, nonwoven fibrous web having an initial width, an initial thickness, an initial basis weight, an initial low-elongation cross-web extensibility expressed as an initial load to achieve 10% cross-web elongation, an initial intermediate-elongation cross-web extensibility expressed as an initial load to achieve 30% cross-web elongation, an initial cross-web strength, and an initial elongation capability;

b. gripping the web between the interengaged forming rolls at a nip defined by the forming rolls, wherein each forming roll includes a plurality of axially spaced, circumferentially extending, alternating radial teeth and intervening grooves, and wherein the teeth of one roll are opposite from and extend into the grooves of the opposed roll;

c. modifying the nonwoven web by subjecting the nonwoven web to incremental lateral stretching as the web passes between the interengaged forming rolls and as the rolls rotate in opposite directions, to incrementally stretch the web in a cross-web direction that is substantially perpendicular to the web movement direction and withdrawing the web from between the interengaged forming rolls by applying to the web a tensile withdrawal force that extends in the web movement direction, wherein the resulting modified web has a load to achieve 10% elongation of from about 5% to about 100% of the initial load to achieve 10% elongation, a load to achieve 30% elongation of from about 5% to about 100% of the initial load to achieve 30% elongation, a cross-web strength of from about 10% to about 80% of the initial cross-web strength, and a cross-web elongation capability of from about 105% to about 200% of the initial cross-web elongation capability.

2. A method in accordance with claim 1 wherein the resulting modified web has a web width that is from about 25% to about 300% of the initial web width.

3. A method in accordance with claim 1, wherein the web has an initial web thickness of from about 5 mils to about 20 mils and wherein the resulting modified web has a web thickness that is from about 85% to about 400% of the initial web thickness.

4. A method in accordance with claim 1, wherein the resulting modified web has a thickness which is greater than the initial web thickness, and a modified basis weight which is less than the initial web basis weight.

5. A method in accordance with claim 1 wherein the teeth and grooves of each forming roll are circumferentially continuous.

6. A method in accordance with claim 1, wherein the teeth of at least one of the forming rolls include a plurality of spaced, circumferential recesses.

7. A method in accordance with claim 1, including the additional step of joining the nonwoven web in face-to-face relationship with a polymeric film to form a composite material.

8. A method in accordance with claim 7, wherein the resulting composite material has an MVTR of from about 500 g/m$^2$/24 hr to about 5000 g/m$^2$/24 hr, has a dynamic impact value of less than about 10 g/m$^2$, and has an O$_2$ permeation rate of from about 2 m$^3$O$_2$/m$^2$/24 hr. to about 20 m$^3$O$_2$/m$^2$/24 hr.

9. A method in accordance with claim 8, wherein the polymeric film includes an incompatible inorganic material dispersed substantially uniformly therethrough, wherein the inorganic material is selected from the group consisting of calcium carbonate, clay, titanium dioxide, and mixtures thereof.

10. A method in accordance with claim 7, wherein the polymeric film is a breathable, monolithic film, and wherein the resulting composite material has an MVTR of from about 500 g/m$^2$/24 hr to about 5000 g/m$^2$/24 hr and has a dynamic impact value of less than about 10 g/m$^2$.

11. A method for modifying a pre-formed, nonwoven fibrous web, said method comprising the steps of:

a. feeding in a web movement direction to a first pair of opposed, interengaged forming rolls a substantially untensioned, nonwoven fibrous web having an initial width, an initial thickness, an initial basis weight, an initial low-elongation cross-web extensibility expressed as an initial load to achieve 10% cross-web elongation, an initial intermediate-elongation cross-web extensibility expressed as an initial load to achieve 30% cross-web elongation, an initial cross-web strength, and an initial elongation capability;

b. gripping the web between the first pair of interengaged forming rolls at a nip defined by the forming rolls, wherein each forming roll includes a plurality of axially spaced, circumferentially extending, alternating radials teeth and intervening grooves, and wherein the teeth of one roll are opposite from and extend into the grooves of the opposed roll;

c. modifying the nonwoven web by subjecting the nonwoven web to incremental lateral stretching as the web passes between the first pair of interengaged forming rolls and as the rolls rotate in opposite directions, to incrementally stretch the web in a cross-web direction that is substantially perpendicular to the web movement direction and withdrawing the web from between the first pair of interengaged forming rolls by applying to the web a tensile withdrawal force that extends in the web movement direction;

d. feeding in a web movement direction to a second pair of opposed, interengaged forming rolls;

e. gripping the web between the second pair of interengaged forming rolls at a nip defined by the forming rolls, wherein each forming roll includes a plurality of axially spaced, circumferentially extending, alternating radial teeth and intervening grooves, and wherein the teeth of one roll are opposite from and extend into the grooves of the opposed roll;

f. further modifying the nonwoven web by subjecting the nonwoven web to incremental lateral stretching as the web passes between the second pair of interengaged forming rolls and as the rolls rotate in opposite directions, to incrementally stretch the web in a cross-web direction that is substantially perpendicular to the web movement direction and withdrawing the web from between the second pair of interengaged forming rolls by applying to the web a tensile withdrawal force that extends in the web movement direction, wherein the resulting further modified web has a load to achieve 10% elongation of from about 5% to about 100% of the initial load to achieve 10% elongation, a load to achieve 30% elongation of from about 5% to about 100% of the initial load to achieve 30% elongation, a cross-web strength of from about 10% to about 70% of the initial cross-web strength, and a cross-web elongation capability of from about 105% to about 200% of the initial cross-web elongation capability.

12. A method in accordance with claim 11, wherein the forming rolls defining one of the two pairs of forming rolls each have teeth and grooves that are circumferentially continuous, and the teeth of at least one of the forming rolls defining the other pair of the two pairs of forming rolls include a plurality of spaced, circumferential recesses.

13. A method in accordance with claim 11, including the additional step of joining the modified nonwoven web in face-to-face relationship with a polymeric film prior to step e. to form a composite material.

14. A method in accordance with claim 13, wherein the resulting composite material has an MVTR of from about 500 g H$_2$O/m$^2$/24 hr to about 5000 g H$_2$O/m$^2$/24 hr, has a dynamic impact value of less than about 10 g/m², and has an O₂ permeation rate of from about 2 m³O₂/m²/24 hr. to about 20 m³O₂/m²/24 hr.

15. A method in accordance with claim 14, wherein the polymeric film includes an incompatible inorganic material dispersed substantially uniformly therethrough, wherein the inorganic material is selected from tho group consisting of calcium carbonate, clay, titanium dioxide, and mixtures thereof, and wherein passing the joined modified nonwoven web and polymeric film between the second pair of interengaged forming rolls imparts tensile forces to the film to stretch the polymer matrix and cause localized separation of the thermoplastic polymer from the incompatible material to form micropores in the film.

16. A method in accordance with claim 13, wherein the polymeric film is a breathable, monolithic film and wherein the resulting composite material has an MVTR of from about 500 g H₂Om²/24 hr to about 5000 g H₂/m²/24 hr and has a dynamic impact value of less than about 10 g/m².

17. A method for forming a composite elastic material having a modified nonwoven component and an elastic component, said method comprising the steps of:
   a. feeding in a web movement direction to a first pair of opposed, interengaged forming rolls a substantially untensioned, preformed, nonwoven fibrous web having an initial elongation capability;
   b. gripping the web between the first pair of interengaged forming rolls at a nip defined by the forming rolls, wherein each forming roll includes a plurality of axially spaced, circumferentially extending, alternating radial teeth and intervening grooves, and wherein the teeth of one roll are opposite from and extend into the grooves of the opposed roll;
   c. modifying the nonwoven web by subjecting the nonwoven web to incremental lateral stretching as the web passes between the first pair of interengaged forming rolls and as the rolls rotate in opposite directions, to incrementally stretch the web in a cross-web direction that is substantially perpendicular to the web movement direction and withdrawing the web from between the first pair of interengaged forming rolls by applying to the web a tensile withdrawal force that extends in the web movement direction, wherein the modified web has a cross-web elongation capability of from about 50% to about 200% of the initial cross-web elongation capability;
   d. joining an elastic web to the modified nonwoven web to form a composite elastic material.

18. A method in accordance with claim 17, wherein the force-to-elongate the resulting composite elastic material at extensions between about 50% and 200% is less than about 40% greater than the force-to-elongate the elastic web alone at extensions between about 50% and 200%.

19. A method in accordance with claim 18, wherein the force-to-elongate the resulting composite elastic material at extensions between about 50% and 200% is less than about 600 g/in.

20. A method in accordance with claim 17, wherein the resulting composite elastic material is breathable.

* * * * *

UNITED STATES PATENT AND TRADEMARK OFFICE
CERTIFICATE OF CORRECTION

PATENT NO. : 6,383,431 B1
DATED : May 7, 2002
INVENTOR(S) : Dobrin et al.

It is certified that error appears in the above-identified patent and that said Letters Patent is hereby corrected as shown below:

Column 6,
Line 41, delete "proper ties" and insert -- properties --.

Column 8,
Line 42, delete "ends" and insert -- tips --.

Column 9,
Line 27, delete "angles" and insert -- angled --.

Column 10,
Ine 4, delete "tire" and insert -- the --.

Column 23,
Line 61, delete "clushed" and insert -- flushed --.

Column 27,
Line 31, delete "feorce" and insert -- force --.

Column 28,
Line 9, delete "is" and insert -- as --.

Column 40,
Line 12, delete "radials" and insert -- radial --.

Column 41,
Line 7, delete "tho" and insert -- the --.

Signed and Sealed this

Fifteenth Day of June, 2004

JON W. DUDAS
*Acting Director of the United States Patent and Trademark Office*